US012416442B2

(12) United States Patent
Bae et al.

(10) Patent No.: US 12,416,442 B2
(45) **Date of Patent: *Sep. 16, 2025**

(54) REFRIGERATOR

(71) Applicant: LG Electronics Inc., Seoul (KR)

(72) Inventors: Seongjin Bae, Seoul (KR); Daekil Kang, Seoul (KR); Jonghyun Lee, Seoul (KR); Wonchan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 18/386,132

(22) Filed: Nov. 1, 2023

(65) Prior Publication Data

US 2024/0060709 A1 Feb. 22, 2024

Related U.S. Application Data

(63) Continuation of application No. 17/348,213, filed on Jun. 15, 2021, now Pat. No. 11,841,186.

(30) Foreign Application Priority Data

Jun. 17, 2020 (KR) ........................ 10-2020-0073938

(51) Int. Cl.

| | |
|---|---|
| ***F25D 23/02*** | (2006.01) |
| ***E05F 5/02*** | (2006.01) |
| *F25D 23/08* | (2006.01) |

(52) U.S. Cl.

CPC .............. *F25D 23/028* (2013.01); *E05F 5/02* (2013.01); *E05Y 2900/31* (2013.01); *F25D 23/087* (2013.01); *F25D 2600/04* (2013.01)

(58) Field of Classification Search

CPC ................. F25D 23/028; F25D 23/087; F25D 2323/011; E05F 5/02; E05Y 2900/31

See application file for complete search history.

(56) References Cited

U.S. PATENT DOCUMENTS

| | | | |
|---|---|---|---|
| 8,162,421 | B2 | 4/2012 | Lim et al. |
| 8,894,168 | B2 | 11/2014 | Lee |

(Continued)

FOREIGN PATENT DOCUMENTS

| | | |
|---|---|---|
| CN | 105157330 | 12/2015 |
| CN | 205192036 U * | 4/2016 |

(Continued)

OTHER PUBLICATIONS

Extended European Search Report in European Appln. No. 21179981.2, dated Nov. 19, 2021, 10 pages.

(Continued)

*Primary Examiner* — Kimberley S Wright

(74) *Attorney, Agent, or Firm* — Fish & Richardson P.C.

(57) ABSTRACT

A refrigerator includes a cabinet defining a storage space, a door configured to open and close the storage space, a gap adjusting member configured to be provided between the door and the cabinet and to adjust a gap between the door and the cabinet, and a seating part configured to protrude from the door and to support the gap adjusting member. The gap adjusting member includes a contact part exposed to the rear of the door and being in contact with the cabinet in a state where the door is closed, and a plurality of adjusting parts protruding from the contact part toward the seating part at different heights from each other. The gap between the door and the cabinet is adjusted by selecting a height of the adjusting part which is in contact with the seating part by rotating the gap adjusting member.

19 Claims, 30 Drawing Sheets

(56) References Cited

U.S. PATENT DOCUMENTS

| | | | |
|---|---|---|---|
| 2008/0203874 A1 | 8/2008 | Lim et al. |
| 2008/0265729 A1 | 10/2008 | Netzer et al. |
| 2012/0032572 A1 | 2/2012 | Lee |
| 2021/0396455 A1 | 12/2021 | Jang et al. |
| 2022/0049892 A1 | 2/2022 | Lim et al. |
| 2022/0107129 A1 | 4/2022 | Lee et al. |

FOREIGN PATENT DOCUMENTS

| | | | |
|---|---|---|---|
| CN | 107328160 A | * 11/2017 |
| EP | 2420775 | 2/2012 |
| KR | 10-2008- 0047151 | 5/2008 |
| KR | 101651139 | 8/2016 |
| KR | 10-2019-0066721 A | 6/2019 |

OTHER PUBLICATIONS

Notice of Allowance in European Appln. No. 21179981.2, mailed on Nov. 20, 2024, 5 pages.

* cited by examiner

REFRIGERATOR

CROSS-REFERENCE TO RELATED APPLICATIONS

The present application is a continuation of U.S. application Ser. No. 17/348,213, filed on Jun. 15, 2021, which claims priority under 35 U.S.C. 119 and 35 U.S.C. 365 to Korean Patent Application No. 10-2020-0073938, filed on Jun. 17, 2020, the disclosures of which are hereby incorporated by reference in their entirety.

BACKGROUND

The present disclosure relates to a refrigerator.

In general, refrigerators are home appliances that allow low-temperature storage of food in an internal storage space that is shielded by a refrigerator door and are configured to store stored foods in an optimal condition by using cold air generated through heat exchange with refrigerant circulating in the refrigeration cycle to cool the interior of the storage space.

As such, refrigerators are gradually becoming larger and multifunctional in accordance with changes in dietary life and high-end products, and refrigerators having various structures and convenience devices in consideration of user convenience are being released.

In addition, in a case where a plurality of doors are disposed side by side in one refrigerator, or in a case where a plurality of refrigerators are disposed in a row when the heights in the front and rear directions between the doors do not match, the outer appearance thereof is not good and there is a problem that may cause user complaints.

In order to prevent this problem, in Korean Patent Laid-Open No. 10-2008-0047151, a refrigerator is disclosed which is provided with a step preventing means corresponding to the thickness of the gasket on the rear surface of the door or on the case, so that when the door is closed, a predetermined gap is maintained between the door and the case.

However, in such a conventional technique, if the step preventing means of the gasket is equal to the height of the gasket, the gasket cannot be in close contact with the interior of the refrigerator due to deformation of the gasket or the like during long-term use, and thus there is a problem that the interior of the refrigerator cannot be completely airtight, and if the step preventing means of the gasket is lower than the height of the gasket, there may also be a problem that the door does not close to the same height.

In particular, the conventional step prevention means cannot adjust the height of the door in the front and rear direction, and only one fixed height is provided, and thus there is a problem that it cannot be effectively responded in situations where height adjusting of both sides of the door is required due to the difference in load in the refrigerator or the like.

In order to prevent such a problem, in Korean Patent Laid-Open No. 10-2019-0066721, a refrigerator is disclosed which has a gap adjusting member provided at the upper end of the door so that the user can adjust the protruding height of the door when the door is closed.

However, in such a conventional technique, in order to adjust the protruding height of the door by using the gap adjusting member, the cover must be mounted again after removing the cover and then manipulating the gap adjusting member to set the height, which is inconvenient to manipulate. In addition, problems such as loss of the detachable cover or separation of the gap adjusting member can be expected.

SUMMARY

An object of an embodiment of the present disclosure is to provide a refrigerator that easily adjusts a protruding height of a front surface of a refrigerator door to eliminate a step from a surrounding structure.

An object of an embodiment of the present disclosure is to provide a refrigerator capable of intuitively identifying an adjusting height when adjusting a step of a refrigerator door.

An object of an embodiment of the present disclosure is to provide a refrigerator capable of ensuring the reliability of a step adjusting manipulation of a refrigerator door.

An object of an embodiment of the present disclosure is to provide a refrigerator having a simple structure for adjusting a step of a refrigerator door.

In a refrigerator according to an embodiment of the present disclosure, a gap adjusting member mounted on the rear surface of the door and in contact with the front surface of the cabinet in a state where the door is closed includes a contact part which is in contact with the cabinet, and a plurality of adjusting parts disposed to rotate with respect to the center of the contact part and having different heights, and in which the height of the gap adjusting member is adjusted by rotating the gap adjusting member.

In a refrigerator according to an embodiment of the present disclosure, a gap adjusting member provided on a rear surface of a door and in contact with the front surface of the cabinet when the door is closed includes a contact part which is in contact with the cabinet, an adjusting part disposed along the front circumference of the contact part and formed to be stepped at different heights, and a height indicating part formed on the front surface of the contact part and indicating a height of the adjusting part at a position corresponding to the adjusting part.

A refrigerator according to an embodiment of the present disclosure includes a seating part formed on a rear surface of a door, and a gap adjusting member mounted on the seating part and in contact with the front surface of the cabinet when the door is closed, in which the gap adjusting member includes a contact part which protrudes outside the seating part to contact the cabinet, an adjusting part which is continuously disposed in a polygonal shape on a front surface of the contact part and has different heights, in which an inside of the seating part is formed in a polygonal shape corresponding to the adjusting part so that the adjusting part is inserted.

A refrigerator according to an embodiment of the present disclosure includes a seating part formed on a rear surface of a door, and a gap adjusting member mounted to be movable in the front and rear direction to the seating part and in contact with the front surface of the cabinet when the door is closed, in which the gap adjusting member include a contact part in contact with the cabinet, an insertion protrusion extending from a contact part and mounted through the seating part and serving as a rotation shaft of the gap adjusting member, and an adjusting part disposed in front of the contact portion to rotate around an insertion protrusion and having different heights, in which the height of the gap adjusting member is adjusted by rotating the gap adjusting member after moving the gap adjusting member backward.

A refrigerator according to an embodiment of the present disclosure may include a cabinet configured to form a storage space, a door configured to open and close the storage space, a gap adjusting member configured to be provided between the door and the cabinet and to adjust a gap between the door and the cabinet, and a seating part configured to protrude from the door and to support the gap adjusting member, in which the gap adjusting member may include a contact part exposed to the rear of the door and being in contact with the cabinet in a state where the door is closed, and a plurality of adjusting parts protruding from the contact part toward the seating part at different heights from each other, and in which the gap between the door and the cabinet may be adjusted by selecting a height of the adjusting part which is in contact with the seating part by rotating the gap adjusting member.

The plurality of adjusting parts may be continuously disposed in a height order.

The plurality of adjusting parts may be located at equal gaps with respect to the center of the contact part.

The plurality of adjusting parts may be disposed to rotate with respect to the center of the contact part.

The adjusting part may be sequentially formed to be stepped in a rotation direction.

The contact part may be formed in a polygonal shape, and the adjusting part may be formed along each side of the contact part.

The adjusting part may be formed to be stepped stepwise by the same height difference in a rotation direction along each side of the contact part.

The adjusting part may include a main adjusting part protruding along each side of the contact part, and a sub adjusting part protruding from the inside of the main adjusting part more than the main adjusting part and formed along each side of the main adjusting part, and in which the height difference between each side of the plurality of main adjusting part and the plurality of sub adjusting part may be formed to be same.

The main adjusting part and the sub adjusting part may be sequentially formed to be stepped in a state of being rotated 180° with respect to the center of the contact part.

The sub adjusting part may be formed to have the same cross-sectional size as the inside of the seating part and may be inserted into the seating part.

The seating part may include a main support part forming a circumferential surface of the seating part and supporting the main adjusting part, and a sub support part which is formed on an inside of each side of the main support part and includes a sub-support part for supporting the sub-adjusting part, and in which the main support part and the sub support part may be formed to be stepped with the same height difference as the main adjusting part and the sub adjusting part, respectively.

The seating part may be opened toward the cabinet, and at least a portion of the adjusting part may be inserted.

The seating part may include a main support part that forms a circumferential surface of the seating part and is in contact with the adjusting part.

The seating part may include a sub support part formed in an opened inside of the seating part and is in contact with another part of the adjusting part inserted into the seating part.

The seating part may be formed in a polygonal shape corresponding to the adjusting part, and the sub support part may be configured with a plurality of protrusions protruding from the inside surface of each side of the main support part.

The contact part may be formed with an insertion protrusion inserted into the seating part, and the adjusting part may be disposed to rotate about the insertion protrusion.

A through-hole through which the protrusion passes may be formed in the seating part, and an elastic part may be formed in the insertion protrusion to protrude more than a diameter of the through-hole and to maintain a state where the insertion protrusion is mounted on the seating part.

The gap adjusting member may be at least partially formed of a material that is elastically deformable.

An upper cap deco forming a portion of the upper and rear surfaces of the door may be provided at the upper end of the door, and the seating part may be formed in the upper cap deco.

A top cover which protrudes upward and forms a surface facing the door may be formed on the upper surface of the cabinet, and the contact part may be in contact with the top cover in a state where the door is closed.

DETAILED DESCRIPTION OF THE EMBODIMENTS

Hereinafter, specific embodiments of the present disclosure will be described in detail together with the drawings. However, the present disclosure cannot be said to be limited to the embodiments in which the spirit of the present disclosure is presented, and other disclosures that are regressive by addition, change, deletion, or the like of other components, or other embodiments included within the spirit scope of the present disclosure can be easily suggested.

Figure 2:
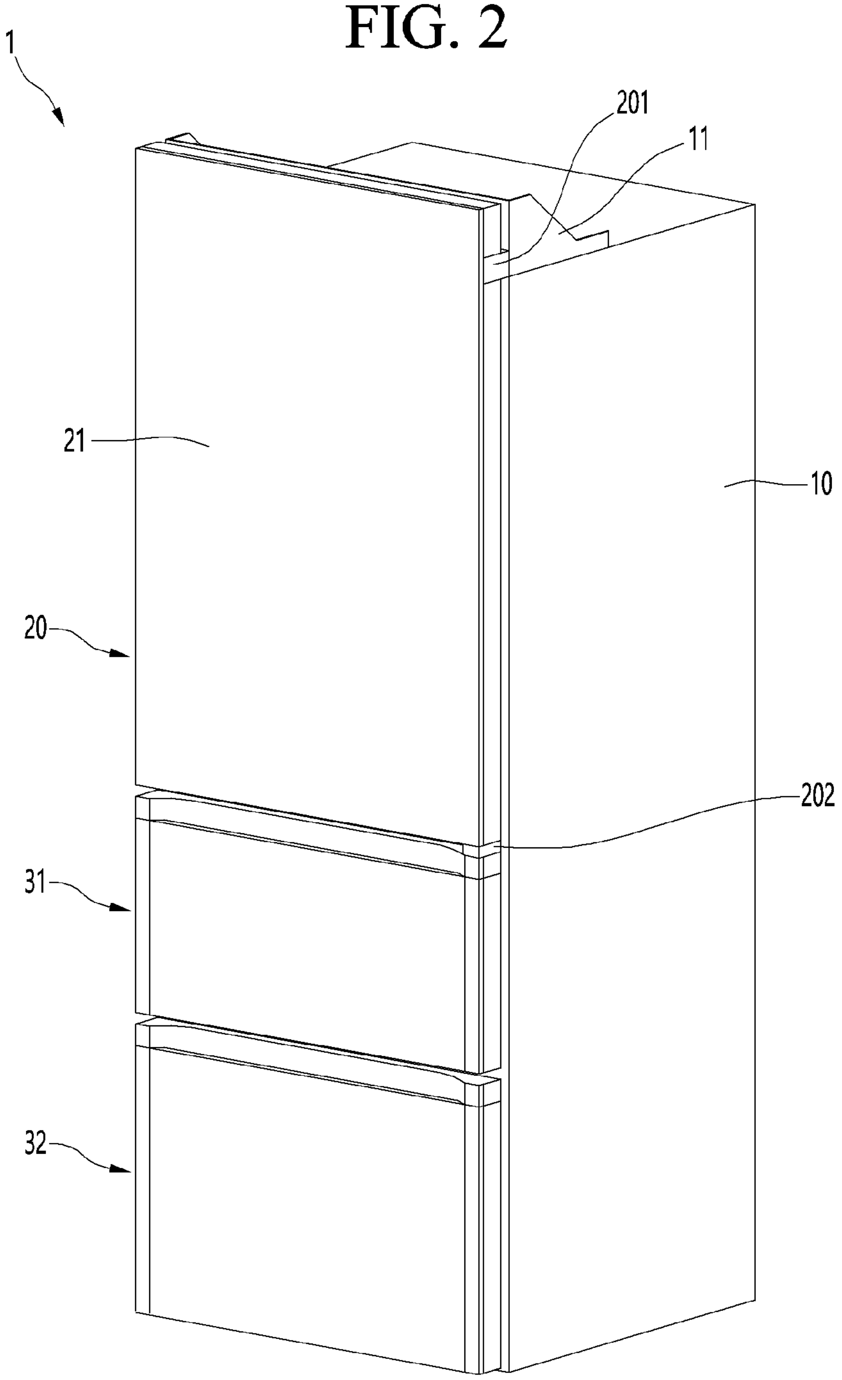
FIG. 2 is a perspective view illustrating the refrigerator.

Define the direction prior to the explanation thereof. According to an embodiment of the present disclosure, the direction toward the front surface of the door as illustrated in FIG. 2 can be defined as front, the direction toward the cabinet with respect to the front surface of the door can be defined as rear, and the direction toward the floor where the refrigerator is installed can be defined as downward, and the direction away from the floor can be defined as upward.

Figure 1:
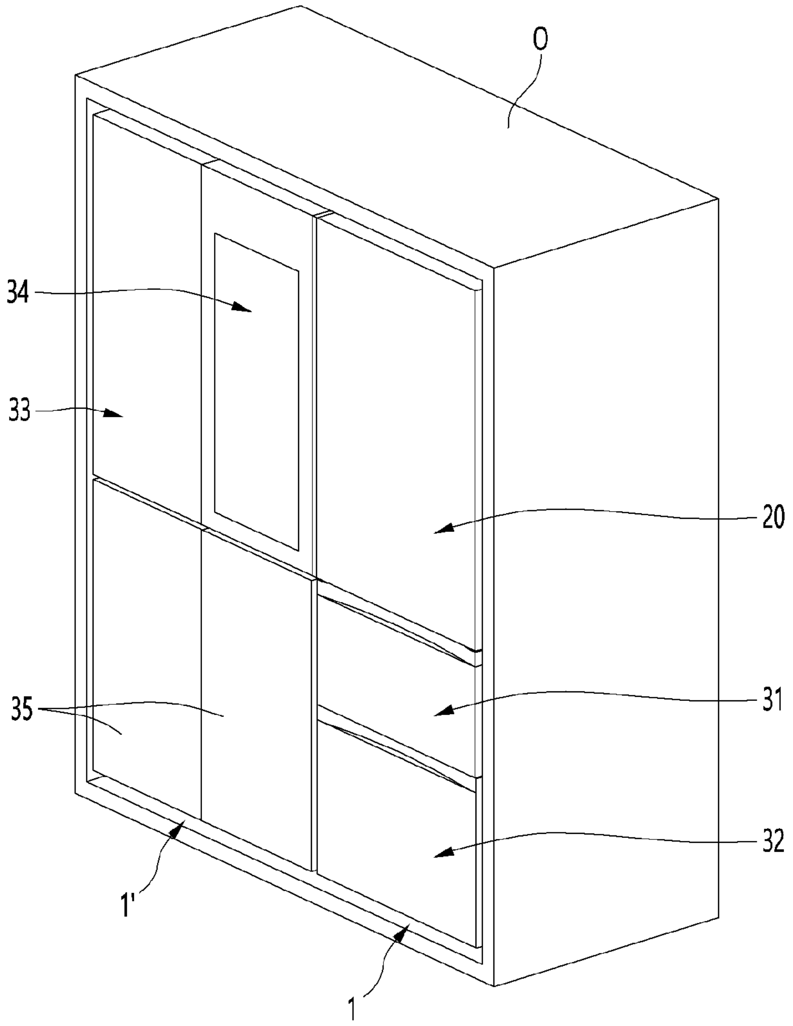
FIG. 1 is a perspective view illustrating a state where a refrigerator according to an embodiment of the present disclosure is installed.

FIG. 1 is a perspective view illustrating a state where a refrigerator according to an embodiment of the present disclosure is installed. In addition, FIG. 2 is a perspective view illustrating the refrigerator.

As illustrated in the drawings, the refrigerator 1 according to the embodiment of the present disclosure has an overall outer appearance by a cabinet 10 forming a storage space with an opened front surface and doors 20 and 30 opening and closing the storage space.

In addition, the refrigerator 1 may be mounted so as to harmonize with the furniture or wall O of the indoor space. For example, as illustrated in FIG. 1, the refrigerator 1 may be installed in an indoor space such as a kitchen and may be disposed adjacent to furniture or a wall O to harmonize. In other words, a space corresponding to the size of the refrigerator 1 may be provided in the furniture or wall O, and the refrigerator 1 may be received or may be disposed in a built-in type therein.

In addition, other refrigerators 1' may be continuously arranged in parallel on the side of the refrigerator 1. In other words, a space in which a plurality of refrigerators 1 and 1' can be disposed may be provided by furniture or a wall O.

The plurality of refrigerators 1 and 1' may have the same structure, and refrigerators 1 and 1' having various structures may be disposed in combination as needed. For example, as illustrated in FIG. 1, in the refrigerator 1 disposed on the right side, doors 20, 31, and 32 may be disposed vertically. In other words, the refrigerator 1 on the right may be configured such that a door 20 that is opened and closed in a rotating manner is provided at the upper side, and doors 31 and 32 that are opened and closed in a sliding manner are provided at the lower side.

In addition, a refrigerator 1' may be further provided on the left side of the refrigerator 1 on the right side. The refrigerator 1' disposed side by side on the left may be configured such that an upper storage space is opened and closed by a pair of doors 33 and 34, and a lower storage space is opened and closed by a pair of doors 35. In addition, the doors 33, 34, and 35 may be configured to open and close in a rotating manner, and these doors 33, 34, and 35 may be referred to as French type doors.

Meanwhile, front plates 21 having the same outer appearance may be mounted on all the front surfaces of the doors 20, 31, 32, 33, 34, and 35 of the refrigerator 1 on the right and the refrigerator 1' on the left. Accordingly, when viewed from the front, the overall outer appearance of the refrigerators 1 and 1' may be formed by the plurality of front plates. In this case, the front plates of the refrigerators 1 and 1' may have the same structure but only differ in size.

In addition, the refrigerator 1 is disposed adjacent to the adjacent refrigerator 1', furniture, or wall O, and adjacent refrigerator 1', furniture, or walls O within a range that does not interfere when the doors 20 and 30 are opened or closed can be disposed close to minimize the clearance therebetween.

Meanwhile, in a state where the doors 20, 31, 32, 33, 34 and 35 of the refrigerators 1 and 1' are closed, it is preferable that the front surfaces of the refrigerators 1 and 1' are located on the same plane, but according to a load applied to the door 20, 31, 32, 33, 34, and 35 during use of the refrigerators 1,1' or a state of the installation and use of the refrigerators 1, 1', the closing amount of the door 20, 31, 32, 33, 34, and 35 may vary, and the protrusion degree of the doors 20, 31, 32, 33, 34, and 35, that is, the height in the front and rear direction may vary.

In this case, the front surfaces of some of the doors 20, 31, 32, 33, 34, and 35 of the doors 20, 31, 32, 33, 34, and 35 further protrude and are located in front of the front surfaces of other doors 20, 31, 32, 33, 34, and 35 and thus the doors 20, 31, 32, 33, 34, and 35 have a step with respect to each other and do not have a sense of unity with other doors 20, 31, 32, 33, 34, and 35 or surrounding furniture or walls O. Accordingly, the user can adjust the protruding height of the doors 20, 31, 32, 33, 34, and 35 using the gap adjusting member 40, which will be described below.

The gap adjusting member 40 can be applied to all of the doors 20, 31, 32, 33, 34 and 35 of the refrigerator 1 and 1' and in the following, for the convenience of understanding and explanation, and to prevent duplication of description, the refrigerator 1 on the right side of the refrigerators 1 and 1' of FIG. 1 will be described in more detail.

The refrigerator 1 may have an outer appearance formed by the cabinet 10 and the doors 20, 31, and 32. In addition, in the cabinet 10, the storage space may be divided vertically, an upper door 20 may be provided in the upper storage space, and lower doors 31 and 32 may be provided in the lower storage space.

In addition, a top cover 11 may be provided on the upper surface of the cabinet 10. The top cover 11 may extend along the front upper end of the cabinet 10 and may extend to a height corresponding to the height of the upper door 20. Therefore, when the upper door 20 is closed, the refrigerator can have a more united outer appearance. In addition, the top cover 11 may receive a part of the upper hinge 201 for rotation of the upper door 20. In addition, the top cover 11 may be provided with a display and a manipulation part for displaying the operating state of the refrigerator 1.

An upper door 20 may be provided in the upper storage space, and a lower door 30 may be provided in the lower storage space. The upper door 20 may open and close the upper storage space by rotation. An upper hinge 201 and a lower hinge 202 are provided at the upper and lower ends of one side of the upper door 20, respectively, and the upper door 20 may be rotatably mounted on the cabinet 10 by the upper hinge 201 and the lower hinge 202. Accordingly, the upper door 20 may be referred to as a rotary door.

In addition, the lower door 30 may be pushed in and pulled out in a drawer type to open and close the lower storage space, and the lower door 30 may be referred to as a drawer door.

The lower door 30 may be provided with two upper and lower doors, and the lower storage space opened and closed by the lower door 30 can consist of one space or also can be partitioned as a space in which each of the lower doors 30 is received.

Meanwhile, the front outer appearances of the upper door 20 and the lower door 31 and 32 may be formed by the front plate 21. The front plates 21 provided in the upper door 20 and the lower doors 31 and 32, respectively, are different only in size and may have the same outer appearance.

In addition, the gap adjusting member 40 for adjusting the upper door 20 and the lower door 31 and 32 to maintain the same front height in a state where the upper door 20 and the lower door 31 and 32 are closed, respectively is provided in the upper door 20 and the lower door 31 and 32.

Hereinafter, for convenience of explanation and understanding, the gap adjusting member 40 will be described based on the upper door 20. In addition, hereinafter, the upper door 20 may be referred to as a door 20.

Figure 3:
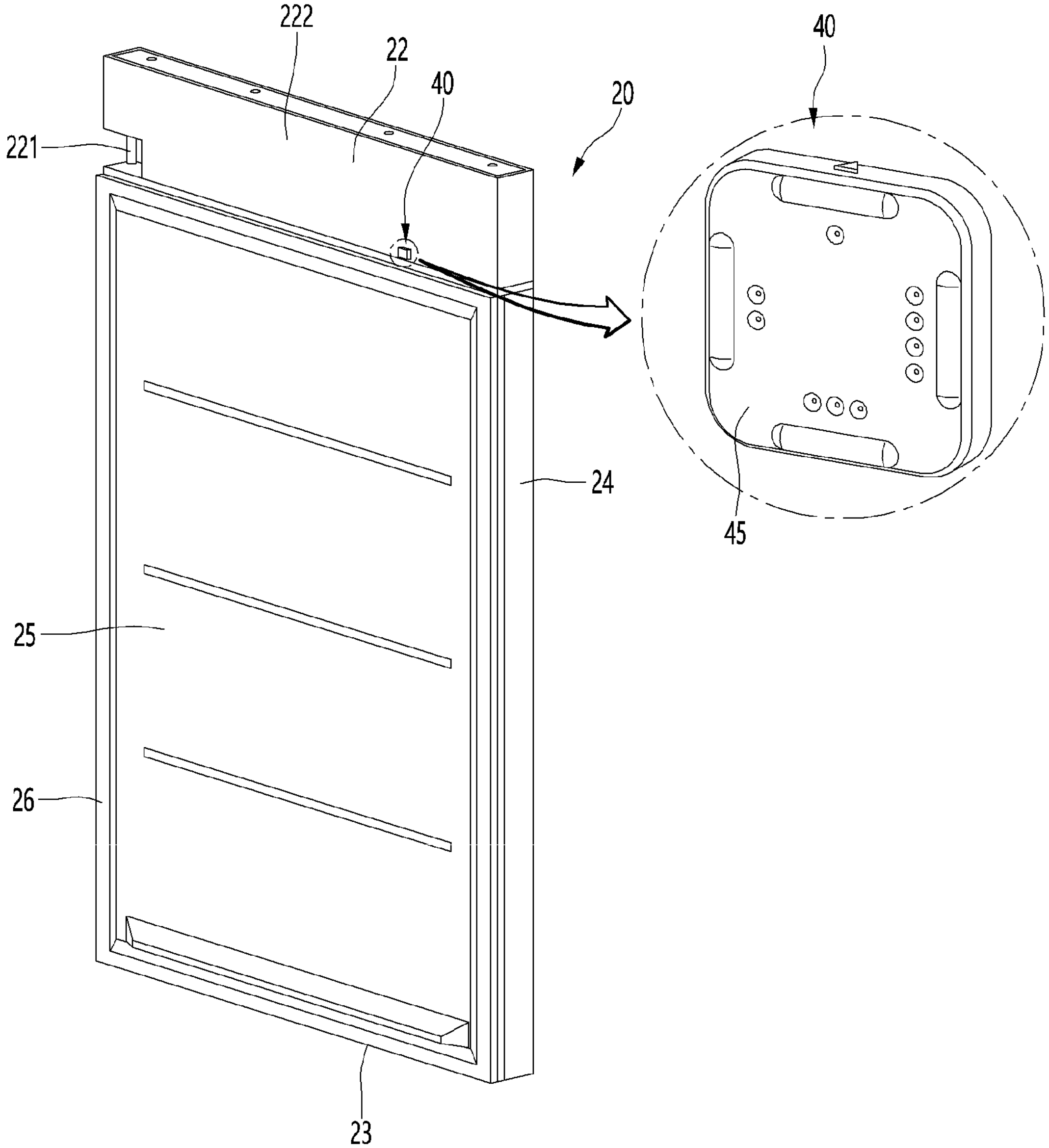
FIG. 3 is a perspective view illustrating a refrigerator door according to an embodiment of the present disclosure viewed from the rear.
Figure 4:
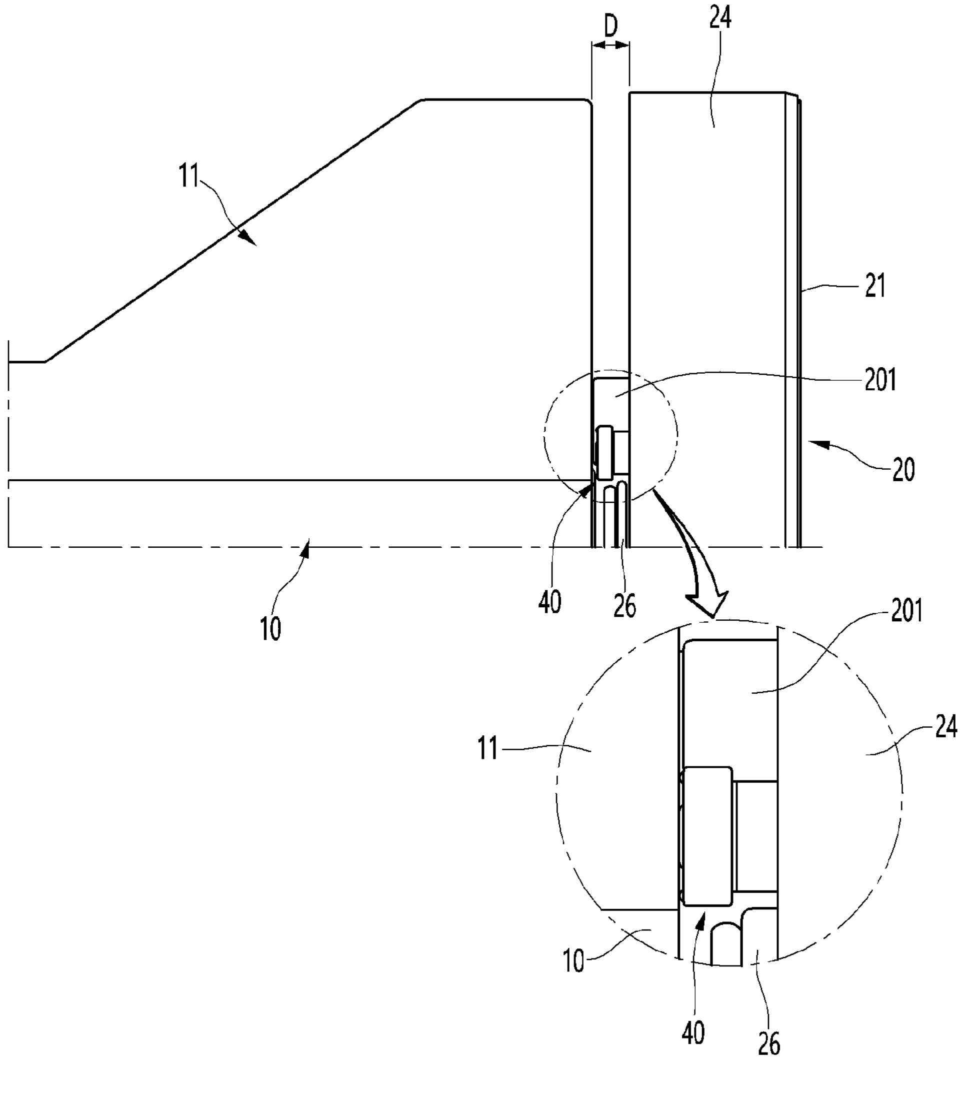
FIG. 4 is a partial side view illustrating a state of a gap adjusting member in a state where the refrigerator door is closed.

FIG. 3 is a perspective view illustrating a refrigerator door according to an embodiment of the present disclosure viewed from the rear. In addition, FIG. 4 is a partial side view illustrating the state of the gap adjusting member when the refrigerator door is closed.

As illustrated in the drawing, the outer appearance of the door 20 may formed by a front plate 21 forming a front surface, a door liner 25 forming a rear surface, an upper cap deco 22 and a lower cap deco 23 forming the upper and lower surfaces. In addition, side frames 24 may be further included on the both left and right side surfaces of the door 20 to form the outer appearance of the both left and right side surfaces. In addition, in the interior of the door 20, an insulating material is molded by a foaming liquid to insulate the storage space.

In detail, the front plate 21 may be formed of a tempered glass or metal material to form the front outer appearance of the door 20. When the side frame 24 is not provided on the door 20, the front plate 21 may form the outer appearance of both side surfaces of the door 20. In addition, the front plate 21 may be formed in a panel structure detachable from the door 20, and it is possible to form an outer appearance that harmonizes with other home appliances such as the neighboring refrigerator 1 and furniture or wall O.

The door liner 25 may be formed in a plate shape to form the outer appearance of the rear surface of the door 20 and may be formed of a plastic material. The door liner 25 may provide a structure in which a pocket or basket for storage is mounted as necessary. In addition, a gasket 26 may be mounted around the door liner 25. When the door 20 is closed, the gasket 26 may be in close contact with the front surface of the cabinet 10 to seal the storage space.

The upper cap deco 42 may be formed of a plastic material and may form the outer appearance of the upper surface and the rear surface 222 of the door 20 when mounted on the door 20. In addition, the front surface of the upper cap deco 22 may support the upper end of the front plate 21. In addition, both left and right side surfaces of the upper cap deco 22 may be coupled to an upper end of the side frame 24.

In particular, the rear surface 222 of the upper cap deco 22 may form the outer appearance of the rear upper surface of the door 20. The rear surface of the door 20 above the gasket 26 may be formed by the upper cap deco 22. The rear surface of the upper cap deco 22 may be formed in a flat shape and may form a surface facing the top cover 11 provided on the upper end of the cabinet 10 and/or the upper surface of the cabinet 10. In addition, a hinge mounting part 221 on which the upper hinge 201 is mounted may be formed at one end of the upper cap deco 22.

In addition, the gap adjusting member 40 may be provided on the rear surface 222 of the upper cap deco 22. The gap adjusting member 40 protrudes from the rear surface of the upper cap deco 22 and may contact the front upper end of the cabinet 10.

The gap adjusting member 40 may be located further outside the gasket 26 and may be located on one side farther than the rotation axis with respect to the center of the door 20. In addition, as illustrated in FIG. 4, when the door 20 is closed, at least a portion of the gap adjusting member 40 may be in contact with the front upper end of the cabinet 10. Accordingly, the door 20 may be supported by the cabinet 10 and may serve as a stopper when the door 20 is closed. The gap adjusting member 40 may be configured to be in contact with the top cover 11, and the top cover 11 may be omitted depending on the height of the cabinet 10.

Meanwhile, the gap adjusting member 40 can adjust the degree of protrusion from the rear surface of the door 20, and by the manipulation of the gap adjusting member 40, the gap D between the rear surface of the door and the front surface of the cabinet can be adjusted. In addition, through this, the degree of protrusion in the front of the door 20 can be adjusted, and other doors 31, 32, 33, 34, and 35 disposed adjacent to each other, or home appliances or furniture or wall O, and the front surface can be entirely adjusted evenly.

In other words, when the door 20 is closed, in a case where the step is generated by the level difference between the other doors 31, 32, 33, 34, and 35, home appliances, furniture, or wall O in the front and rear direction, the height of the front protrusion of the door 20 may be adjusted by manipulating the gap adjusting member 40. Through the manipulation of the gap adjusting member 40, the door 20 may be located on the same plane without a step with other neighboring doors 31, 32, 33, 34, and 35, furniture, or wall O in a closed state. In this case, the same plane does not mean only exactly the same plane and may mean the degree to which the step is checked between the doors 20, 31, 32, 33, 34, and 35 or between the door 20, 31, 32, 33, 34, and 35 and furniture or wall O when viewed in a state of being spaced apart by the predetermined distance from the front of the refrigerator 1.

Hereinafter, the structure of the gap adjusting member 40 will be described in more detail with reference to the drawings.

Figure 5:
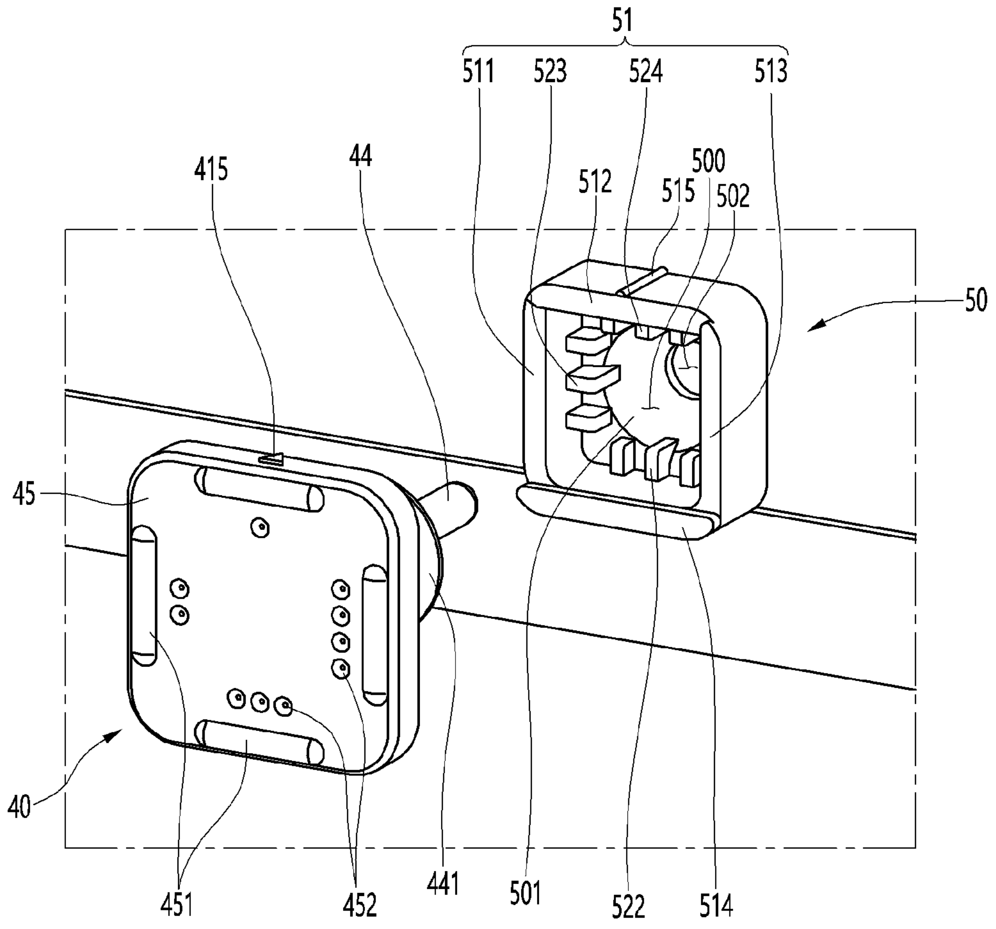
FIG. 5 is an exploded perspective view illustrating a coupling relationship between the gap adjusting member and the seating part.
Figure 6:
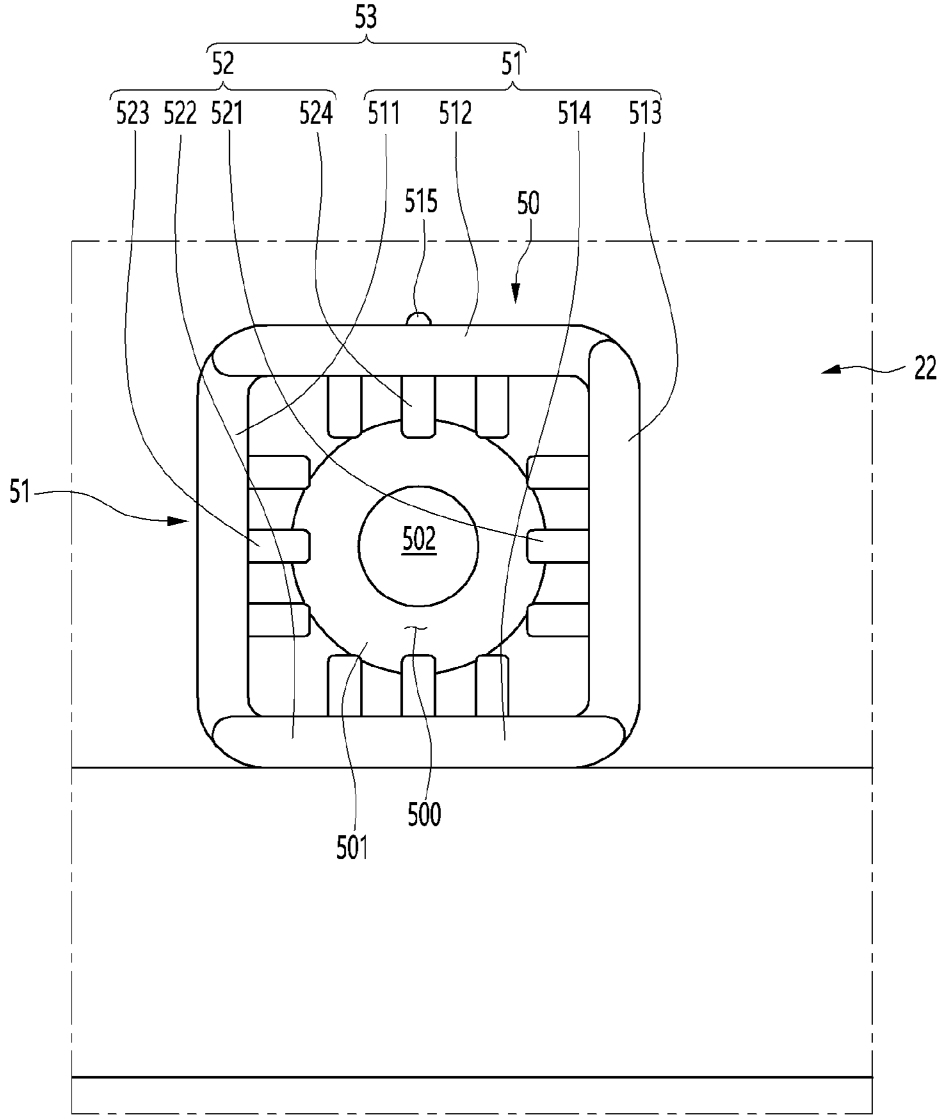
FIG. 6 is a front view illustrating a seating part according to an embodiment of the present disclosure.

FIG. 5 is an exploded perspective view illustrating a coupling relationship between the gap adjusting member and the seating part. In addition, FIG. 6 is a front view illustrating the seating part according to an embodiment of the present disclosure.

As illustrated in the drawing, a seating part 50 on which the gap adjusting member 40 is mounted may be formed on the rear surface of the door 20. The seating part 50 may be formed on the rear surface of the upper cap deco 22. The seating part 50 may be formed at a different position in the rear space of the door 20 outside the gasket 26 so as to be in contact with the cabinet 10 according to the structure of the door 20.

Hereinafter, an example is described that the seating part 50 is formed on the upper cap deco 22, but the seating part 50 may be located at various positions on the rear surface of the door 20.

The seating part 50 may be formed to protrude from one side of the rear surface 222 of the upper cap deco 22 facing the front upper end of the cabinet 10. The seating part 50 may be formed such that the rear surface thereof is opened, and a recessed part is formed inside the opened rear surface to form an receiving space 500 in which a part of the gap adjusting member 40 is received.

The seating part 50 may be provided with a support part 53 on which the adjusting part 43 of the gap adjusting member 40 is seated. In addition, the height of the gap adjusting member 40 may be adjusted by a combination of a contact surface of the adjusting part 43 and the support part 53.

The seating part 50 may be formed to have a polygonal cross-sectional shape when viewed from the front. In addition, the seating part 50 is formed so that each surface of the polygonal shape has a different height and may support the gap adjusting member 40. In an embodiment of the present disclosure, it is described for example that the shape of the seating part 50 and the adjusting part 43 are formed in a rectangular cross-section, but the cross-section of the seating part 50 can be formed in a polygonal shape such as triangle, pentagon, and hexagon, and accordingly, the disposition of the support part 53 will also be possible according to the cross-sectional shape of the seating part.

For example, the seating part 50 may have a rectangular cross-sectional shape, and support parts 53 having different heights may be formed on four protruding surfaces. At least two or more surfaces of the support part 53 may contact the gap adjusting member 40 to determine a protruding height of the gap adjusting member 40. Each of the support parts 53 facing each other may be configured to support the adjusting part 43 to stably support the gap adjusting member 40.

The support part 53 may include a main support part 51 forming a circumference of the seating part 50 and a sub support part 52 formed on an inner surface of the main support part 51.

In detail, referring to FIG. 6, the main support part 51 of the seating part 50 includes a first main support part 511 forming a left surface, a second main support part 512 forming an upper surface, and a third main support part 513 forming a right surface, and a fourth main support part 514 forming a lower surface.

A seating part guide 515 for guiding the alignment and mounting of the gap adjusting member 40 may be formed on an outer surface of the seating part 50. The seating part guide 515 may be formed on an outer surface of the second main support part 512 that forms an upper surface of the seating part 50. The seating part guide 515 may protrude upward from an outer surface of the second main support part 512 and may protrude forward and backward along the center of the second main support part 512.

When the gap adjusting member 40 is mounted, the user may mount the gap adjusting member 40 based on the seating part guide 515. In addition, when the gap adjusting member 40 is mounted, the adjusting member guide 415 formed on the gap adjusting member 40 may be aligned with the seating part guide 515. Accordingly, the gap adjusting member 40 can be mounted at an accurate position, and the gap adjusting member 40 can be manipulated to an exact height desired by the user.

Meanwhile, the first main support part 511, the second main support part 512, the third main support part 513, and the fourth main support part 514 are sequentially connected to each other to have a rectangular cross-sectional shape and an receiving space 500 can be formed therein. The first main support part 511, the second main support part 512, the third main support part 513, and the fourth main support part 514 may protrude vertically from the rear surface of the door 20 and can protrude to have different heights with each other.

For example, the first main support part 511 may have a set height, and the second main support part 512, the third main support part 513, and the fourth main support part 514 are formed to gradually increase in order. In this case, the first main support part 511, the second main support part 512, the third main support part 513, and the fourth main support part 514 may protrude to have a sequential height difference. For example, when the first main support part 511 is formed to have a height of 9 mm, the second main support part 512 is formed to have a height of 9.5 mm, the third main support part 513 is formed to have a height of 10 mm, and the fourth main support part 514 is formed to have a height of 10.5 mm.

In other words, the height of the plurality of main support parts 51 can be adjusted by one level (0.5 mm) each time it is rotated by a 90° angle in the clockwise direction and can return to the original height if the plurality of main support parts rotate one turn (360°).

Therefore, when the gap adjusting member 40 is manipulated in a state where the gap adjusting member 40 is rotated stepwise by a 90° angle at the position where the gap adjusting member 40 is initially mounted, the contact height of the main adjusting part 41 and the main support part 51 may be changed stepwise, and the user may adjust the protruding height of the gap adjusting member 40.

In addition, at least one of the plurality of main support parts 51 may support the gap adjusting member 40 by contacting the main adjusting part 41 of the gap adjusting member 40 to be described below. In other words, the height of the gap adjusting member 40 may be adjusted according to the main support part 51 to be contacted.

Meanwhile, a plurality of sub support parts 52 may be formed inside the seating part 50, that is, inside the receiving space 500. The sub support part 52 is a portion that additionally contacts the gap adjusting member 40, and the gap adjusting member 40 is not inclined and may maintain a more stable support state.

The sub support part 52 is in contact with the sub adjusting part 42 to be described below and allows the gap adjusting member 40 to maintain a more stable support state without being inclined or deviating from a position.

A plurality of sub support part 52 may be formed on each surface of the main support part 51. For example, the sub support part 52 may be composed of three protruding ribs or protrusions on each surface of the main support part 51 and are disposed at predetermined gaps to stably support the sub adjusting part 42. In addition, the sub support part 52 is located further outside the inclined surface 501 to be described below, and a plurality of the sub support part 52 may extend to the same position toward the center of the receiving space 500.

Accordingly, it is possible to prevent the gap adjusting member 40 from being interfered with by the sub support part 52 while the gap adjusting member 40 is detached. In addition, the sub support parts 52 may be disposed on the main support parts 51 at positions facing each other so as to face each other. In addition, the sub support part 52 may be configured to protrude from an inner surface of the main support part 51 and to protrude from each surface to a different height.

In detail, a first sub support part 521 is formed on an inner surface of the third main support part 513, a second sub support part 522 is formed on an inner surface of the fourth main support part 514, and a third sub support part 523 may be formed on an inner surface of the first main support part 511, and a fourth sub support part 524 may be formed on an inner surface of the second main support part 512.

At this time, the height of the first sub support part 521 is the lowest, and the protruding height of the second sub support part 522, the third sub support part 523, and the fourth sub support part 524 in order becomes higher step-wise. In this case, the difference in height of the protrusions between the sub supporting parts 52 may correspond to the difference in height between the main supporting parts 51.

For example, the first sub support part 521 may have a set height and may have the lowest height among a plurality of sub support parts 52. In addition, the second sub support part 522 is formed to be 0.5 mm higher than the first sub support part 521, and the third sub support part 523 is formed to be 0.5 mm higher than the second sub support part 522, and the fourth sub support part 524 may be formed to be 0.5 mm higher than the third sub support part 523. In other words, the plurality of sub support parts 52 can be adjusted in height by one level (0.5 mm) each time they are rotated by 90° in the clockwise direction and return to the original height by rotating one turn (360°).

Therefore, when the gap adjusting member 40 is further rotated stepwise by a 90° angle and then mounted at the position where the gap adjusting member 40 is initially mounted, the contact height of the sub adjusting part 42 and the sub support part 52 may be changed stepwise, and the user may adjust the protruding height of the gap adjusting member 40.

Meanwhile, a through-hole 502 penetrating the rear surface of the door 20, that is, the rear surface of the upper cap deco 22, may be formed in the inner center of the seating part 50. The through-hole 502 may be formed larger than the diameter of the insertion protrusion 44 to be described below and may be formed smaller than the diameter of the elastic main support part 51. Accordingly, when the gap adjusting member 40 is mounted, the insertion protrusion 44 may be inserted and mounted through the through-hole 502. In addition, the elastic main support part 51 may support the circumference of the through-hole 502 in a state of passing through the through-hole 502.

In addition, an inclined surface 501 may be formed around the through-hole 502. The inclined surface 501 may have an inclined shape such that an inner diameter becomes narrower from the front to the rear, and the through-hole 502 may be formed at a front end of the inclined surface 501. In addition, an end portion of the sub support part 52 may be positioned at an outer end of the inclined surface 501. Meanwhile, the inclined surface 501 may have a slope corresponding to the inclined circumferential surface of the elastic main support part 51, and, in the process of inserting the insertion protrusion 44, the inclined surface 501 and the circumferential surfaces of the elastic main support part 51 may be in a state of being in contact with each other and thus the insertion and mounting of the insertion protrusion 44 can be made easier.

Meanwhile, the gap adjusting member 40 has a structure that can be inserted into the seating part 50 and may protrude rearward in a state of being inserted into the seating part 50. In addition, the gap adjusting member 40 may include a contact part 45 having a planar shape, and an insertion protrusion 44 that extends from the center of the rear surface of the contact part 45 and is fixedly mounted to the seating part 50. In addition, an adjusting part 43 that is supported by the seating part 50 and adjusts the height of the gap adjusting member 40 may be formed on the front surface of the contact part 45.

The gap adjusting member 40 may be formed of a rubber or silicone material having an elasticity as a whole, and when the door 20 is closed, the contact part 45 contacts the cabinet 10 and may mitigate the impact of the door 20. Of course, the gap adjusting member 40 may be formed with a material having elasticity only partially, and only the elastic part 441 may be formed to have elasticity.

The contact part 45 may be formed in a rectangular shape when viewed from the front and may be formed in a plate shape having a predetermined thickness. The contact part 45 may be exposed to the outside in a state where the gap adjusting member 40 is mounted on the seating part 50. In addition, the contact part 45 may be exposed and protruded toward the rear of the seating part 50, that is, toward the cabinet 10.

In addition, the rear surface of the contact part 45 facing the front surface of the cabinet 10 may be formed in a planar shape. In addition, a contact protrusion 451 contacting the cabinet 10 may be formed on the contact part 45. The contact protrusion 451 may be formed along each side of the contact part 45. In addition, the contact protrusion 451 may protrude by a predetermined height.

When the door 20 is closed so that the gap adjusting member 40 contacts the front surface of the cabinet 10, the protruding contact protrusion 451 contacts the front surface of the cabinet 10. Accordingly, the gap adjusting member 40 may contact the front surface of the cabinet 10 in a form of line contact, and a contact area with the cabinet 10 may be reduced by the gap adjusting member 40. In addition, even when the gap adjusting member 40 repeatedly contact the front surface of the cabinet 10 due to repetitive opening and closing of the door 20, deformation of the front surface of the cabinet 10 or the occurrence of contact marks can be minimized.

In addition, when the gap adjusting member 40 is in contact with the top cover 11 at least partially, the contact protrusion 451 also has a structure of contacting the front surface of the top cover 11 when the door 20 is closed.

Meanwhile, a height indicating part 452 may be formed on the contact part 45. The height indicating part 452 is for indicating a height set by a manipulation of the gap adjusting member 40 to a user and may be formed on four sides of the contact part 45, respectively. For example, the height indicating part 452 may be indicated as a dot-shaped intaglio-shaped groove, and may indicate a height according to the number of grooves. The height indicating part 452 may be formed of one, two, three, and four grooves on four sides of the contact part 45, respectively.

In addition, when the gap adjusting member 40 is manipulated, the adjusted height by the gap adjusting member 40 can be easily known through the height indicating part 452 positioned at a position corresponding to the seating part guide 515 formed on the seating part 50.

For example, when the height indicating part 452 formed as a single groove is disposed at a position corresponding to the seating part guide 515, it can be seen that the gap adjusting member 40 is set to the lowest height. In addition, when the gap adjusting member 40 is adjusted by the manipulation of the gap adjusting member 40 so that the height indicating part 452 formed of four grooves is disposed at a position corresponding to the seating part guide 515, it can be seen that the gap adjusting member 40 is set to the highest height.

Meanwhile, an adjusting member guide 415 may be formed on the contact part 45. When the gap adjusting member 40 is mounted, the adjusting member guide 415 may assist the gap adjusting member 40 to be positioned in a correct position. The adjusting member guide 415 may be formed on one side of the circumferential surface of the contact part 45. For example, the adjusting member guide 415 may be formed in the center of the upper surface of the four surfaces of the contact part 45 and can be disposed to be located on the same extension line as the seating part guide 515 when the gap adjusting member 40 is mounted. In addition, the surface on which the adjusting member guide 415 is formed may be a surface marked with the lowest height on the height indicating part 452.

Hereinafter, a structure for mounting and adjusting the height of the gap adjusting member 40 will be described in more detail with reference to the drawings.

Figure 7:
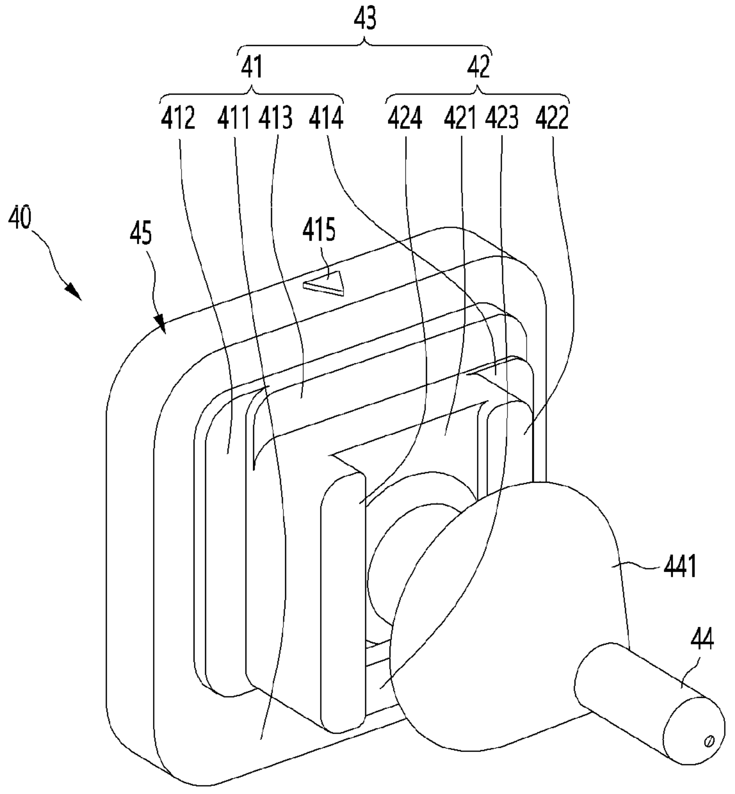
FIG. 7 is a perspective view illustrating the gap adjusting member viewed from one side.
Figure 8:
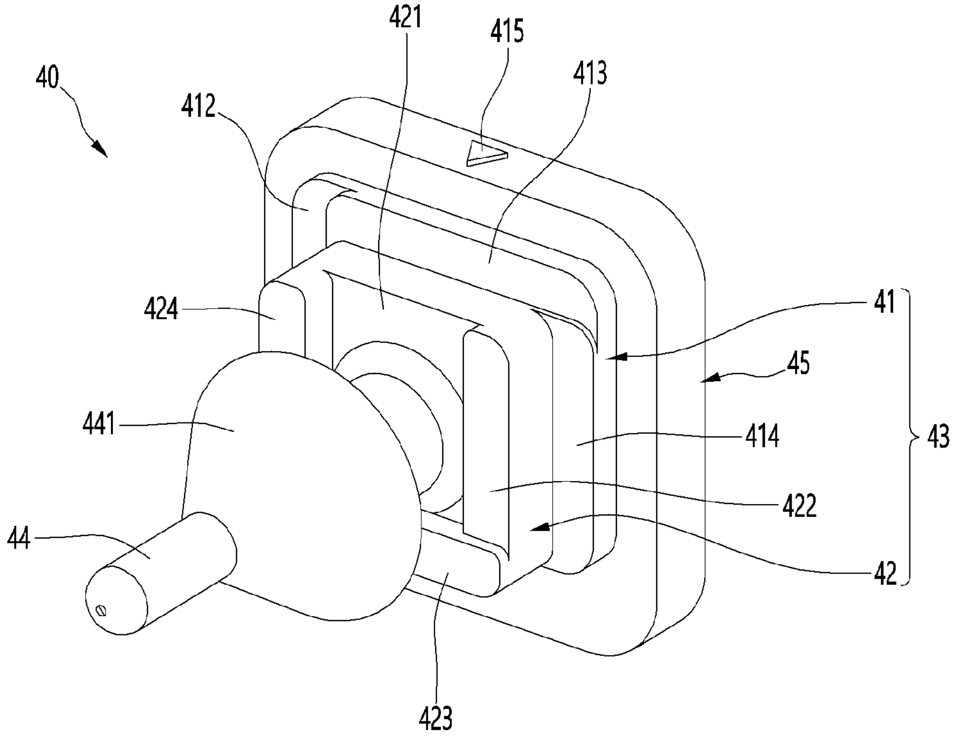
FIG. 8 is a perspective view illustrating the gap adjusting member viewed from another side.

FIG. 7 is a perspective view illustrating the gap adjusting member viewed from one side. In addition, FIG. 8 is a perspective view illustrating the gap adjusting member viewed from the other side.

As illustrated in the drawing, an adjusting part 43 may be formed on the front surface of the contact part 45. The adjusting part 43 supports the gap adjusting member 40 by contact with the support part 53 and can adjust the height of the gap adjusting member 40 according to the position of the support part 53 contacting the adjusting part 43. The adjusting part 43 may include a main adjusting part 41 in contact with the main support part 51 and a sub adjusting part 42 in contact with the sub supporting part 52.

The main adjusting part 41 may be formed on the front surface of the contact part 45 and may be located more outside and more rearward than the sub adjusting part 42. The main adjusting part 41 may be formed at a position corresponding to the protruding end portion of the main support part 51 when the gap adjusting member 40 is mounted.

The main adjusting part 41 allows portions having four different heights to be disposed parallel to the four sides of the contact part 45, and the protruding end portion of the seating part 50 disposed at a position facing each other, that is, the main support part 51 may be positioned at a position facing each other. In addition, the main adjusting part 41 may be formed along the circumference of the sub adjusting part 42 to be described below.

In detail, the main adjusting part 41 may be composed of a first main adjusting part 411, a second main adjusting part 412, a third main adjusting part 413, and a fourth main adjusting part 414, along the front surface of the contact part 45.

The first main adjusting part 411 forms the same plane as the front surface of the contact part 45 and has the lowest height among the main adjusting parts 41. In addition, the second main adjusting part 412 may extend in a direction crossing by a 90° angle from the end portion of the first main adjusting part 411 and can be formed one level higher than the first main adjusting part 411. In addition, the third main adjusting part 413 may extend in a direction crossing by a 90° angle from the end portion of the second main adjusting part 412 and can be formed one level higher than the second main adjusting part 412. In addition, the fourth main adjusting part 414 may extend in a direction crossing by a 90° angle from the end portion of the third main adjusting part 413, and the end portion thereof can be formed to be connected to the first main adjusting part 411. In addition, the fourth main adjusting part 414 may be formed one level higher than the third main adjusting part 413.

For example, the first main adjusting part 411, the second main adjusting part 412, the third main adjusting part 413, and the fourth main adjusting part 414 each can be formed to be increase in height stepwise by approximately 0.5 mm. In other words, the height difference between the main adjusting parts 41 may be configured to correspond to the height difference between the main support parts 51. Therefore, when the gap adjusting member 40 is mounted so that the adjusting member guide 415 and the seating part guide 515 are aligned, the first main support part 511 can be mounted in a state of contacting the fourth main adjusting part 414, the second main support part 512 can be mounted in a state of contacting the third main control part 413, the third main support part 513 can be mounted in a state of contacting the second main control part 412, and the fourth main support part 514 can be mounted in a state of contacting the first main adjusting part 411.

Meanwhile, the sub adjusting part 42 may be further formed on the gap adjusting member 40. The sub adjusting part 42 is in contact with the sub support part 52 so that the gap adjusting member 40 is stably supported and is located inside the main adjusting part 41 and may have a structure protruding further forward than the main adjusting part 41.

In addition, the sub adjusting part 42 is formed to be inserted into the receiving space 500 inside the seating part 50 when the gap adjusting member 40 is mounted. The sub adjusting part 42 may be formed in a shape and a size corresponding to the receiving space 500. Therefore, when the gap adjusting member 40 is mounted on the seating part 50, the sub adjusting part 42 is inserted into the receiving space 500, and the outer surface of the sub adjusting part 42 can be in contact with the inner surface of the main support part 51. Therefore, even if an impact is applied to the gap adjusting member 40 when the door 20 is closed, the gap adjusting member 40 can maintain a stable mounting state without changing or dropping the mounting position.

In addition, the sub adjusting part 42 is a part supported by the sub supporting part 52 when the gap adjusting member 40 is mounted, and the main adjusting part 41 and the main support part 51 can compensate for the inability to ensure stable support.

Each of the sub adjusting parts 42 may be formed along four sides of the contact part 45, and each of the sub-adjusters 42 may have different heights. In other words, the sub adjusting part 42 can additionally support the step adjustment member 40 when the main support part 51 and the main control part 41 having different heights are rotated and mounted to each other.

The sub adjusting part 42 as a whole protrudes more forward than the main control part 41 and may be formed by protruding a central part of the space formed by the main adjusting parts 41. The sub adjusting part 42 may include a first sub adjusting part 421, a second sub adjusting part 422, a third sub adjusting part 423, and a fourth sub adjusting part 424 protruding along a position corresponding to the main adjusting part, respectively.

In detail, the first sub adjusting part 421 may be formed at a position corresponding to the upper surface of the contact part 45 and may protrude from a position corresponding to the third main adjusting part 413. The first sub adjusting part 421 protrudes more forward than the main adjusting part 41 but may have the lowest height among the sub adjusting parts 42. In addition, the protruding height of the first sub adjusting part 421 may be formed to correspond to a height difference between the second main support part 512 and the fourth sub support part 524.

The second sub adjusting part 422 may extend in a direction crossing by a 90° angle from the end portion of the first sub adjusting part 421 and may be formed one level higher than the first sub adjusting part 421. In addition, the third sub adjusting part 423 may extend in a direction crossing by a 90° angle from the end portion of the second sub adjusting part 422 and may be formed one level higher than the second sub adjusting part 422. In addition, the fourth sub adjusting part 424 may extend in a direction crossing by a 90° angle from the end portion of the third sub adjusting part 423 and the end portion thereof may be formed to be connected to the first sub adjusting part 421. In addition, the fourth sub adjusting part 424 may be formed one level higher than the third sub adjusting part 423.

For example, the first sub adjusting part 421, the second sub adjusting part 422, the third sub adjusting part 423, and the fourth sub adjusting part 424 each can be formed to be increase in height by approximately 0.5 mm stepwise. In other words, the height difference between the sub adjusting parts 42 may be configured to correspond to the height difference between the sub support parts 52. When the gap adjusting member 40 is mounted so that the adjusting member guide 415 and the seating part guide 515 are aligned, the first sub adjusting part 421 can be mounted in a state of being in contact with the fourth sub support part 524, the second sub adjusting part 422 can be mounted in a state of being in contact with the third sub supporting part 523, the third sub adjusting part 423 can be mounted in a state of being in contact with the second sub supporting part 522, and the fourth sub adjusting part 424 can be mounted in a state of being in contact with the first sub adjusting part 521.

An insertion protrusion 44 protruding forward may be formed in the center of the sub adjusting part 42. The insertion protrusion 44 is for fixing and mounting the gap adjusting member 40 to the rear surface of the door 20 and can be formed to extend forward from the central portion of the space formed by the sub adjusting part 42. The extension length of the sub adjusting part 42 is such that the elastic part 441 formed in the insertion protrusion 44 can pass through the through-hole 502 and protrude by a length that can be inserted into the door 20.

The elastic part 441 (restrain part) may be formed to protrude outward from one side of the insertion protrusion 44, and in a state where the gap adjusting member 40 is mounted on the door 20, the gap adjusting member 40 can be prevented from being separated by being locked by the circumference of the through-hole 502. In addition, by the elastic force provided by the elastic part 441, the gap adjusting member 40 may be returned to the inserted state in the seating part 50 after manipulation.

In detail, the elastic part 441 may have a structure that protrudes outward from one side of the insertion protrusion 44 along the circumference of the insertion protrusion 44 and extends rearward. At this time, the connection position of the elastic part 441 and the insertion protrusion 44 may be determined as a position in which the elastically deformed state can be maintained while the elastic part 441 does not fall out through the through-hole 502 when the sub adjusting part 42 pulls the gap adjusting member 40 so as to deviate from the seating part 50.

In addition, the elastic part 441 may be formed to be further away from the outer surface of the insertion protrusion 44 as it extends rearward. In other words, the circumferential surface of the elastic part 441 may be formed to have an inclination and may be formed to have an inclination corresponding to the inclined surface 501.

In addition, the elastic part 441 may be formed to a thickness that is easily elastically deformed. Therefore, when the gap adjusting member 40 is mounted on the seating part 50, the elastic part 441 is elastically deformed and moved along the inclined surface 501, and then can pass through the through-hole 502. In addition, in a state where the gap adjusting member 40 is mounted, the elastic part 441 is elastically deformed according to the manipulation of the gap adjusting member 40, so that it may be possible to move the step adjustment member 40 in the front and rear direction and return to the initial position by elasticity.

Hereinafter, a state where the gap adjusting member 40 is mounted will be described in more detail with reference to the drawings.

Figure 9:
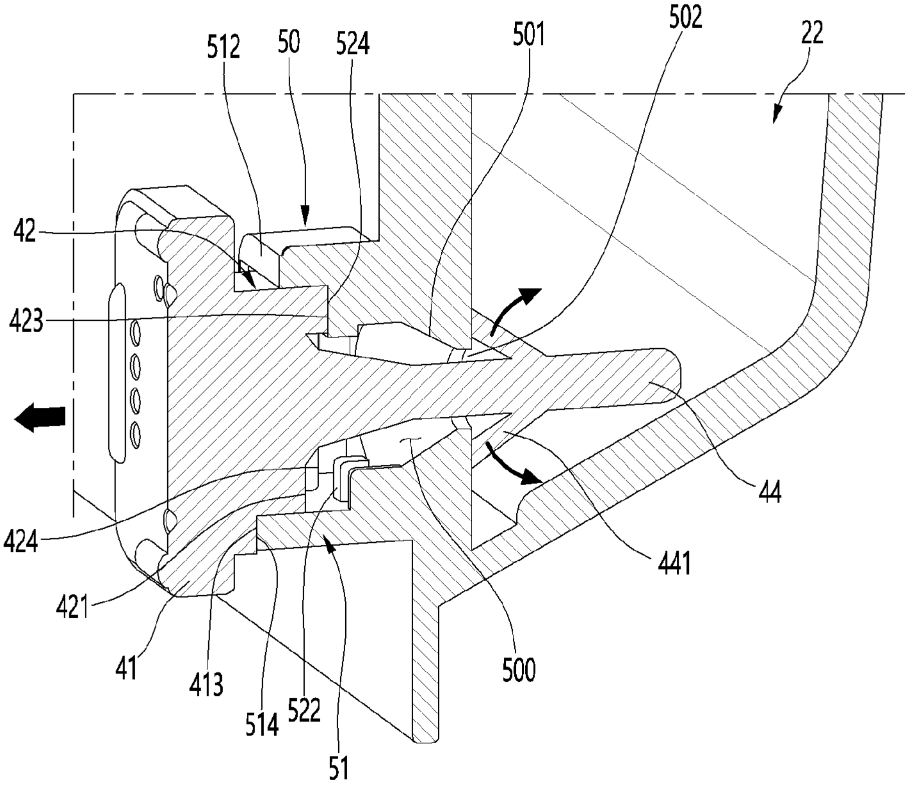
FIG. 9 is a cut-away perspective view illustrating a state where the gap adjusting member is seated.

FIG. 9 is a cut-away perspective view illustrating the gap adjusting member in a seated state.

As illustrated in the drawing, the gap adjusting member 40 may be mounted on the rear surface of the door 20 in a state of being seated on the seating part 50, and protrudes from the rear surface of the door 20 to the rear and thus when the door 20 is closed, the door contacts the cabinet 10 so that the rotation of the door 20 is stopped.

In order to mount the gap adjusting member 40 to the seating part 50, first, the insertion protrusion 44 is inserted into the through-hole 502 while the adjusting member guide 415 and the seating part guide 515 are aligned. Further, the insertion protrusion 44 is inserted until the elastic part 441 passes through the through-hole 502, and when the elastic part 441 passes through the through-hole 502, the insertion of the gap adjusting member 40 may be completed.

In addition, when the gap adjusting member 40 is mounted on the seating part 50, the sub adjusting part 42 of the gap adjusting member 40 can be inserted in the receiving space 500 inside the seating part 50. In a state where the adjusting member guide 415 and the seating part guide 515 are aligned to be positioned on the same line, each part of the main adjusting part 41 and the sub adjusting part 42 of the gap adjusting member 40 may be mounted to be in contact with the main support part 51 and the sub support part 52 of the seating part 50, respectively.

Accordingly, the gap adjusting member 40 is mounted on the seating part 50 at an accurate position and can stably support the cabinet 10 at a set height by maintaining the mounted state. In addition, in the state where the gap adjusting member 40 is mounted, the extended rear end of the elastic part 441 is supported on the inside surface of the door 20, that is, the inside surface of the upper cap deco 22.

Meanwhile, in the state as illustrated in FIG. 9, if the user wants to adjust the degree of protrusion of the front surface of the door 20 while the gap adjusting member 40 is manipulated to have the third highest height, the height of the gap adjusting member 40 is manipulated.

In order to adjust the height of the gap adjusting member 40, the user can pull the contact part 45 of the gap adjusting member 40 rearward and rotates the contact part 45 by a set angle and then can mount on the seating part 50. In this case, the gap adjusting member 40 may be rotated about the insertion protrusion 44 as a shaft. Through such a simple operation, the height of the gap adjusting member 40 can be adjusted from the rear surface of the door 20.

Hereinafter, the manipulation state of the gap adjusting member 40 will be described with reference to the drawings.

Figure 10:
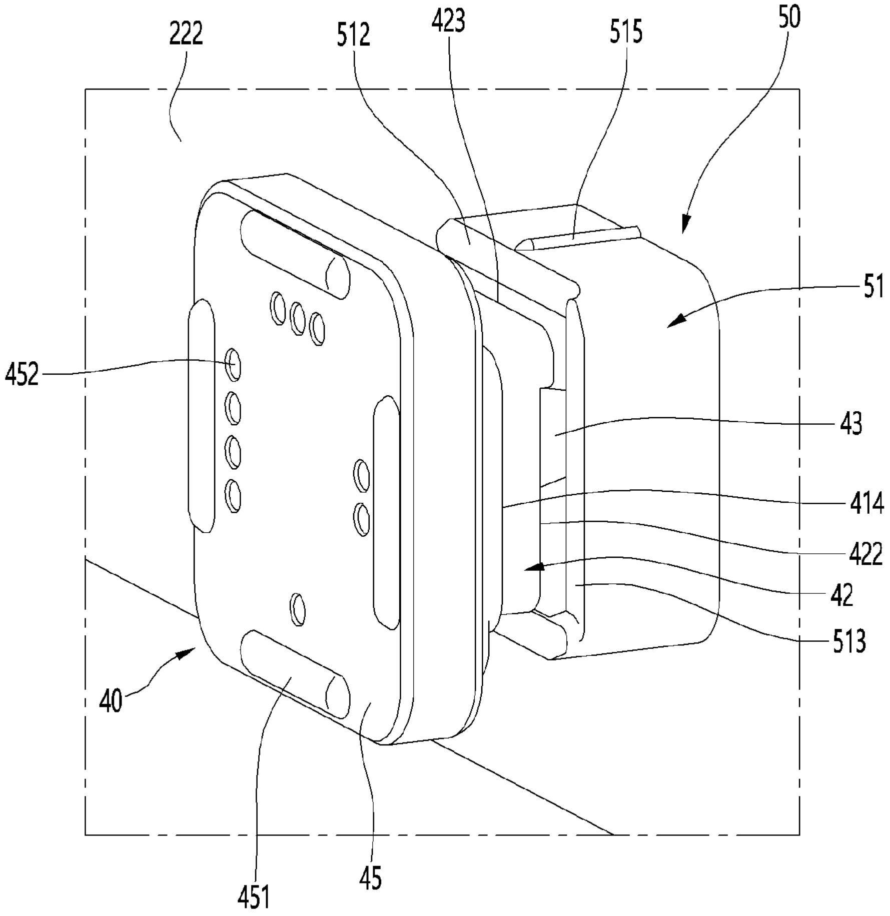
FIG. 10 is a perspective view illustrating a state where the gap adjusting member is pulled out for height adjustment.
Figure 11:
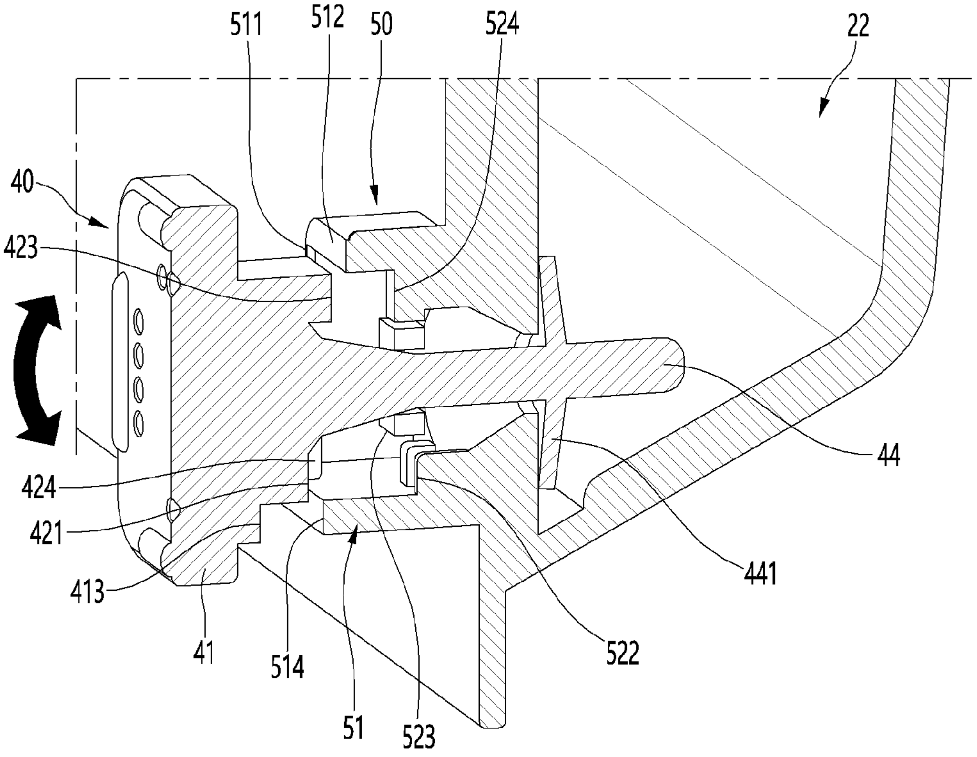
FIG. 11 is a cut-away perspective view of FIG. 9.

In addition, FIG. 10 is a perspective view illustrating a state where the gap adjusting member is pulled out for height adjusting. In addition, FIG. 11 is a cut-away perspective view of FIG. 10.

As illustrated in the drawings, in order to adjust the height of the gap adjusting member 40, the gap adjusting member 40 is pulled rearward. The gap adjusting member 40 may be moved rearward until the sub adjusting part 42 completely deviates from the opened rear surface of the seating part 50.

When the gap adjusting member 40 is pulled rearward, the insertion protrusion 44 is also moved rearward, and the elastic part 441 supported by the circumferential surface of the through-hole 502 is elastically deformed. The elastic part 441 may be elastically deformed while being pressed relatively forward as the gap adjusting member 40 is moved backward.

Accordingly, the elastic part 441 is elastically deformed outward by the pressure of the rear surface of the door 20 and maintains a contact state with the rear surface of the door 20. In addition, when the sub adjusting part 42 is moved rearward until it is located deviating from the receiving space 500, the pressure of the elastic part 441 is maximized, and the elastic part 441 is also can be elastically deformed in an extended state.

The user pulls the sub adjusting part 42 backward and pulls the sub adjusting part 42 out to the opened rear surface of the receiving space 500 and then rotates the contact part 400 in a desired direction by a set angle. Whenever the contact part 400 is rotated at a set angle (in units of 90°), it is possible to adjust the height by one level and may be set to a desired height.

In this case, the user can determine the set height of the gap adjusting member 40 by looking at the height indicating part 452. In other words, the user may rotate the gap adjusting member 40 so that the height indicating part 452 having a desired height is positioned on the same extension line as the seating part guide 515.

When the contact part 400 is placed in a state where the gap adjusting member 40 is rotated to a height desired by the user, the sub adjusting part 42 can be inserted into the inside of the receiving space 500 by the restoring force of the extended elastic part 441. In addition, the main adjusting part 41 and the sub adjusting part 42 of the gap adjusting member 40 are supported by the main support part 51 and the sub support part 52 at a set position, respectively, and the gap adjusting member 40 can be the set height.

Hereinafter, the support state of the gap adjusting member 40 and the seating part 50 at each height at which the gap adjusting member 40 is manipulated will be described in more detail with reference to the drawings.

Figure 12:
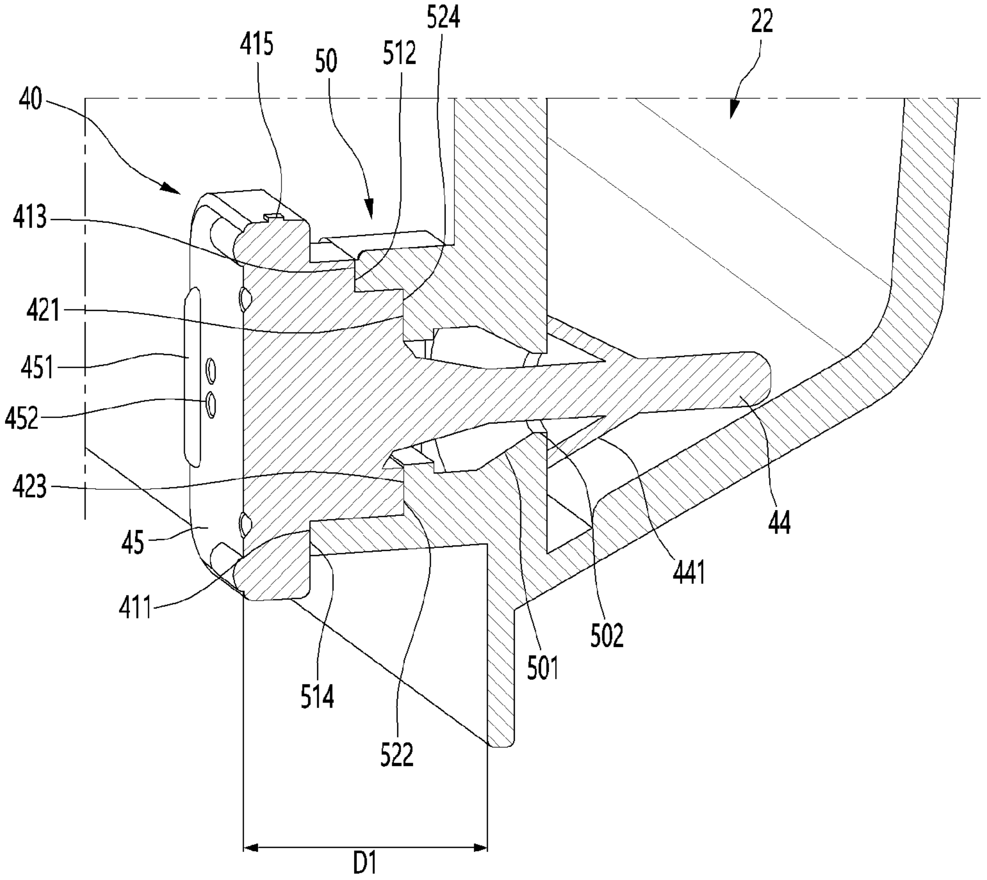
FIG. 12 is a cut-away perspective view illustrating the height adjusting state of a first level height adjusting state of the gap adjusting member.

FIG. 12 is a cut-away perspective view illustrating the first level height adjusting state of the gap adjusting member in one step.

As illustrated in the drawing, when the gap adjusting member 40 is first assembled to the door, it may be assembled in the first level height state as illustrated in FIG. 12. At this time, when the gap adjusting member 40 is mounted in a case where the adjusting member guide 415 and the seating part guide 515 are disposed on the same line, it can be checked that the gap adjusting member 40 is mounted at the correct position.

In addition, the height indicating part 452, which is a standard for determining the height of the gap adjusting member 40, may be determined based on that disposed on an extension line of the seating part guide 515. In other words, the height of the gap adjusting member 40 is determined by reading the uppermost height indicating part 452. In FIG. 12, it may be recognized that the height indicating part 452 including one groove is positioned at the uppermost position and has the lowest height. For example, as illustrated in FIG. 12, at the first level of height D1, a height of approximately 10.5 mm may be obtained from the rear surface of the door 20 to the rear end of the gap adjusting member 40. In other words, the distance between the rear surface of the door 20 and the cabinet 10 may be adjusted to 10.5 mm.

In a state where the gap adjusting member 40 is mounted, the sub adjusting part 42 is inserted into the receiving space 500 of the seating part 50 to maintain a stable mounting state. At this time, the sub adjusting part 42 having a rectangular cross-section is disposed inside the receiving space 500 having the same cross-sectional structure to maintain a stable mounting state without causing flow or deviating from the mounting position.

In addition, the control part 43 and the support part 53 as a whole have a stable support structure in contact with each other. In detail, the third main control part 413 and the first sub adjusting part 421 positioned at the upper side of the adjusting part 43 are in a state of being supported by contacting the second main support part 512 and the fourth sub support part 524 located at the upper side of the support part 53, respectively.

The first main control part 411 and the third sub adjusting part 423 positioned at the lower side of the control part 43 are in a state of being supported by contacting the fourth main support part 514 located at the lower side of the support part 53 and the second sub supports 522, respectively.

Further, although not illustrated in detail, the adjusting parts 43 and the support parts 53 disposed on both left and right sides may also be supported by each other at positions facing each other. In other words, the fourth main adjusting part 414 and the second sub adjusting part 422 positioned on the left side may be supported by contacting the first main support part 511 and the third sub support part 523, respectively. In addition, the second main adjusting part 412 and the fourth sub adjusting part 424 positioned on the right side may be supported by contacting the third main support part 513 and the first sub support part 521, respectively.

In this way, in a state where the gap adjusting member 40 is adjusted to a first-level height D1, all four surfaces of the upper, lower, left, and right sides of the adjusting part 43 are in contact with all four surfaces of the support part 53 and thus can maintain a stable support state.

In this way, the control part 43 and the support part 53 have a structure in which the entire surfaces facing each other are supported. Therefore, even if an impact or a load is applied to the contact part 45 to an eccentric position, the gap adjusting member 40 can be maintained without deviating from the mounting position.

In addition, although not illustrated, the adjusting parts 43 and the support parts disposed on both left and right sides are also supported at positions facing each other, so that the entire four surfaces can maintain a stable support state.

Meanwhile, in such a state, when the height of the front surface of the door 20 is low and a step occurs with the front surface of another door 20 or home appliance, furniture or wall O adjacent thereto, the gap adjusting member 40 is manipulated to increase the height thereof.

To this end, the user grabs the exposed contact part 45 as illustrated in FIG. 11 and pulls the contact part backward, so that the adjusting part 43 is deviated from the inside of the seating space, and then rotates and then the used releases the adjusting part, and by the elastic force of the elastic part 441, the gap adjusting member 40 can be mounted back to the seating part 50. At this time, the height of the gap adjusting member 40 to be adjusted can be checked through the height indicating part 452, and the cross-sectional structure of the adjusting part 43 and the seating part is made of a polygonal structure, so that the combination of the adjusting part 43 and the seating part at the correct position can be induced.

Figure 13:
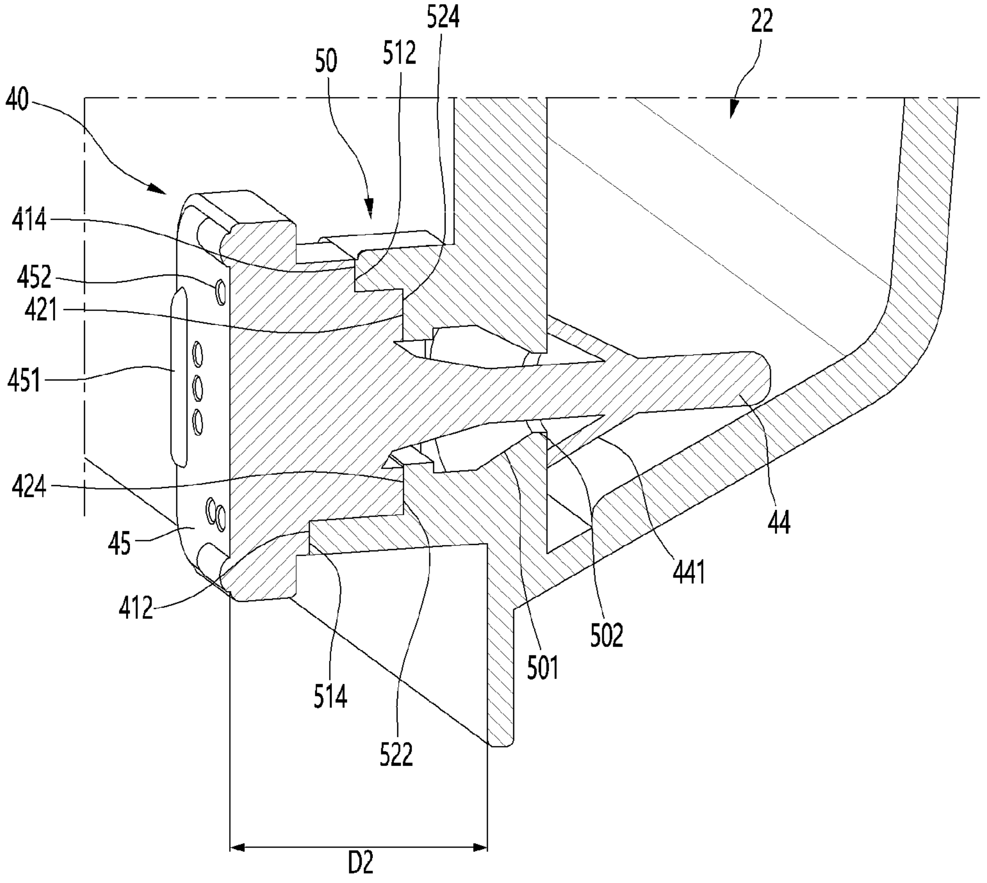
FIG. 13 is a cut-away perspective view illustrating a second level height adjusting state of the gap adjusting member.

FIG. 13 is a cut-away perspective view illustrating a two level height adjusting state of the gap adjusting member.

As illustrated in the drawing, the user can manipulate the gap adjusting member 40 to have a second step height by performing a manipulation of rotating the gap adjusting member 40 clockwise by 90° based on FIG. 12. For example, in the second level height D2, a height of about 11 mm may be obtained from the rear surface of the door 20 to the rear end of the gap adjusting member 40. In other words, the gap between the rear surface of the door 20 and the front surface of the cabinet 10 may be adjusted to 11 mm, and it can be seen that the height increases by one level (5 mm) compared to the first step height.

Looking at the states of the adjusting part 43 and the support part 53 at this time, the fourth main adjusting part 414 and the second sub adjusting part 422 among the adjusting parts 43 are located on the upper side by the rotation of the gap adjusting member 40. In addition, the fourth main adjusting part 414 and the second sub adjusting part 422 are in a state of being supported by contacting the second main support part 512 and the fourth sub support part 524, respectively, positioned on the upper side of the support part 53.

In addition, the second main adjusting part 412 and the fourth sub adjusting part 424 among the adjusting parts 43 are positioned at the lower side by the rotation of the gap adjusting member 40. In addition, the second main adjusting part 412 and the fourth sub adjusting part 424 are in a state of contacting the fourth main support part 514 and the second sub support part 522 located at the lower side of the support part 53, respectively.

In addition, although not illustrated in detail, the third main adjusting part 413 and the first sub adjusting part 421 on the right side of the adjusting parts 43 and the support parts 53 disposed on both left and right sides may be disposed to face each other with the third main support part 513 and the first sub support 521. At this time, the third main adjusting part 413 and the third main supporting part 513 are in contact with each other, but the first sub adjusting part 421 and the first sub supporting part 521 have a low protruding height and thus can be in a state of being spaced apart from each other.

In addition, the first main adjusting part 411 and the third sub adjusting part 423 on the left side of the adjusting parts 43 and the support parts 53 disposed on both left and right sides may be disposed to face each other with the first main support part 511 and the third sub support part 523. At this time, the first main control part 411 and the first main support part 511 have a low protruding height and are spaced apart from each other, but the third sub adjusting part 423 and the third sub support part 523 may be in a state of being in contact with each other.

In this way, the adjusting part 43 and the support part 53 have a structure that supports each other at the upper and lower positions, which are positions facing each other on the upper, lower, left, and right four surfaces. Therefore, even if an impact or a load is applied to the contact part 45 to an eccentric position, the gap adjusting member 40 can be maintained without deviating from the mounting position.

In addition, compared with the first level height of FIG. 12, the position of the adjusting part 43 supported by the seating part 50 by 90° rotation of the gap adjusting member 40 can be changed to the adjusting parts 43 that are one level higher. Accordingly, the distance D2 (11 mm) between the rear surface of the door 20 and the cabinet 10 increases, and the front surface of the door 20 can be further protruded.

At this time, when the gap adjusting member 40 is rotated, the user can check the height of two levels by placing the height indicating part 452 consisting of two grooves on the upper side, and by inserting the adjusting part 43 having a polygonal shape into the receiving space 500, the correct height to be desired can be adjusted.

Figure 14:
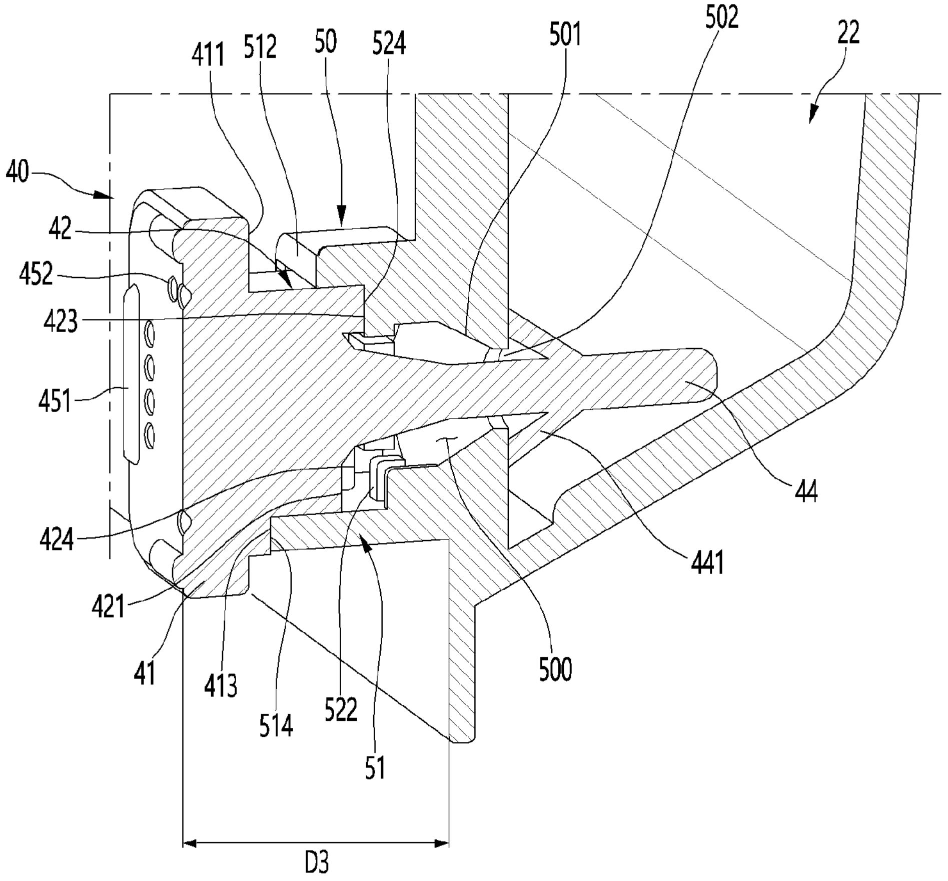
FIG. 14 is a cut-away perspective view illustrating a third level height adjusting state of the gap adjusting member.

FIG. 14 is a cut-away perspective view illustrating a third level height adjusting state of the gap adjusting member.

As illustrated in the drawing, the user can manipulate the gap adjusting member 40 to have a third level height by performing a manipulation of rotating the gap adjusting member 40 by 180° in the clockwise direction with reference to FIG. 12. For example, in the third level height D3, a height of about 11.5 mm may be obtained from the rear surface of the door 20 to the rear end of the gap adjusting member 40. In other words, the gap between the rear surface of the door 20 and the cabinet may be adjusted to 11.5 mm, and it can be seen that the height increases by two levels (10 mm) compared to the height of the first level.

Looking at the states of the adjusting part 43 and the support part 53 at this time, the first main adjusting part 411 and the third sub adjusting part 423 among the adjusting parts 43 by the rotation of the gap adjusting member 40 are located on the upper side. In addition, the first main adjusting part 414 and the third sub adjusting part 422 are positioned at a positon which faces each other with the second main support part 512 and the fourth sub support part 524 positioned on the upper side of the support part 53.

In this case, the first main adjusting part 411 having a relatively low protrusion height is spaced apart from the second main support part 512, and the third sub adjusting part 423 having a relatively high protruding height may be in a state of being supported in contact with the forth sub support part 524.

In addition, the third main adjusting part 413 and the first sub adjusting part 421 among the adjusting parts 43 are positioned at the lower side by the rotation of the gap adjusting member 40. Among these, the first sub adjusting part 421 and the second sub support part 522 having a relatively low protrusion height are spaced apart from each other, and the third main control part 413 can be in a supported state by being in contact with the fourth main support part 514.

In addition, although not illustrated in detail, the fourth main adjusting part 414 and the second sub adjusting part 422 of the right side among the adjusting parts 43 and the support part 53 placed on both sides of the left and right are disposed to face each other with the third main support part 513 and the first sub support part 521. In this case, the fourth main adjusting part 414 and the third main support part 513 are in contact with each other, but the second sub-adjusting part 422 and the first sub-supporting part 521 may be a state of having a low protruding height so that they will be spaced apart from each other.

In addition, the second main adjusting part 412 and the fourth sub adjusting part 424 on the left of the adjusting parts 43 and the support parts 53 disposed on both sides of the left and right may be disposed to face each other with the first main support part 511 and the third sub support part 523. At this time, the second main adjusting part 412 and the first main support part 511 are spaced apart from each other due to their low protruding height, but the fourth sub adjusting part 424 and the third sub support part 523 are in a state of being in contact with each other.

In this way, the adjusting part 43 and the support part 53 have a structure that supports each other on the upper, lower, left, and right four surfaces. Therefore, even if an impact or a load is applied to the contact part 45 to an eccentric position, the gap adjusting member 40 can be maintained without leaving the mounting position.

In addition, compared with the first level height of FIG. 12, the position of the adjusting part 43 supported by the seating part 50 by 180° rotation of the gap adjusting member 40 can be changed to the third sub adjusting part 423 and the third main adjusting part 413, which is two levels higher. Accordingly, the distance D3 (11.5 mm) between the rear surface of the door 20 and the cabinet 10 increases and the front surface of the door 20 can be further protruded.

At this time, when the gap adjusting member 40 is rotated, the user can check the third level height by placing the height indicating part 452 consisting of three grooves on the upper side, and the polygonal adjusting part 43 and it is possible to adjust to the desired correct height by inserting the adjusting part 43 inserted into the receiving space 500.

Figure 15:
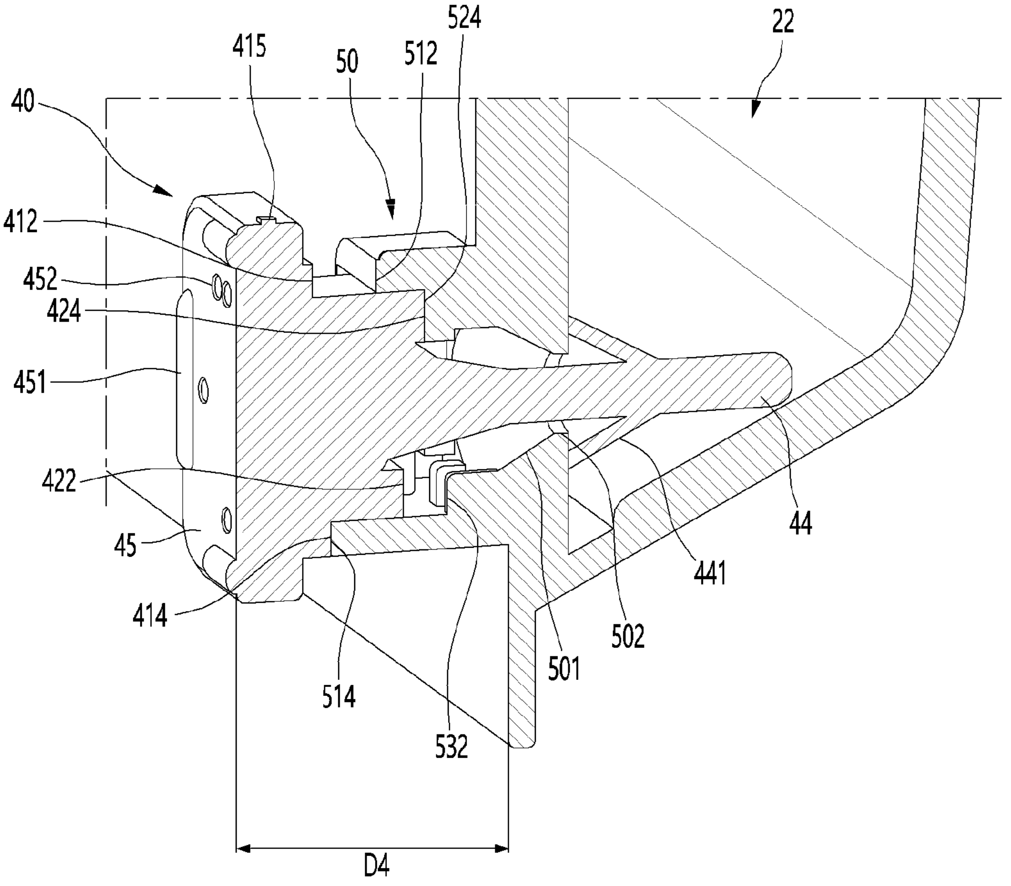
FIG. 15 is a cut-away perspective view illustrating a fourth level height adjusting state of the gap adjusting member.

FIG. 15 is a cut-away perspective view illustrating a fourth level height adjusting state of the gap adjusting member.

As illustrated in the drawing, the user can manipulate the gap adjusting member 40 to have the fourth level height by performing a manipulation of rotating the gap adjusting member 40 by 270° in the clockwise direction based on FIG. 12. For example, at the fourth level height D3, a height of about 12 mm may be obtained from the rear surface of the door 20 to the rear end of the gap adjusting member 40. In other words, the gap between the rear surface of the door 20 and the cabinet may be adjusted to 12 mm, and it can be seen that the height increases by two levels (10 mm) compared to the first step height.

Looking at the states of the adjusting part 43 and the support part 53 at this time, the second main adjusting part 412 and the fourth sub adjusting part 424 among the adjusting parts 43 are positioned on the upper side by the rotation of the gap adjusting member 40, and the second main control part 412 and the fourth sub adjusting part 424 are in a state where the second main support part 512 and the fourth sub support part 524 faces each other with the second main support part 512 and the fourth sub support part 524, respectively.

In this case, the second main adjusting part 412 and the second main support part 512 are spaced apart from each other due to a relatively low protrusion height, and the fourth sub adjusting part 424 having a relatively high protrusion height may be in a state of being supported in contact with the sub supporting part 524.

In addition, by the rotation of the gap adjusting member 40, the fourth main adjusting part 414, and the second sub adjusting part 422 of the adjusting part 43 are located at the lower side, and the fourth main adjusting part 414 and the second sub adjusting part 422 are in a state of facing each other with the fourth main support part 514 and the second sub support part 522, respectively.

In this case, the fourth main adjusting part 414 and the fourth main supporting part may be supported with each other, and the second sub adjusting part 422 having a relatively low protruding height may be spaced apart from the second sub support part 522.

In addition, although not illustrated in detail, the first main adjusting part 411 and the third sub adjusting part 423 on the right side of the adjusting parts 43 and support parts 53 disposed on both left and right sides may be disposed to face each other with the main support part 513 and the first sub support part 521, respectively. In this case, both of the first main adjusting part 411 and the third sub adjusting part 423 may be in a state spaced apart from the third main support part 513 and the first sub support part 521.

In addition, the third main adjusting part 413 and the first sub adjusting part 421 on the left of the adjusting parts 43 and the support parts 53 disposed on both left and right sides may be disposed to face each other with the first main support part 511 and the third sub support part 523. In this case, both of the third main adjusting part 413 and the first sub adjusting part 421 may be in a state of being spaced apart from the first main support part 511 and the third sub support part 523 from each other.

In this way, the adjusting part 43 and the support part 53 have a structure that supports each other on the upper and lower surfaces. Although the adjusting part 43 and the support part 53 come into contact with each other only on two surfaces unlike in the above levels 1 to 3, the adjusting part 43 and the support part 53 have a structure that is supported in the vertical direction facing each other since the fourth sub adjusting part 424 is supported by the fourth sub support part 524 from the upper side, and the fourth main adjusting part 414 is supported by the fourth main support part 514 from the lower side. Therefore, even if an impact or a load is applied to the contact part 45 to an eccentric position, the gap adjusting member 40 can be maintained without deviating from the mounting position.

In addition, compared with the first level height of FIG. 12, the position of the adjusting part 43 supported by the seating part 50 by 270° rotation of the gap adjusting member 40 can be changed to the fourth sub adjusting part 424 and the fourth main control part 414 which are three levels higher. Accordingly, the distance D4 (12 mm) between the rear surface of the door 20 and the cabinet 10 increases, and the front surface of the door 20 can be further protruded.

At this time, when the gap adjusting member 40 is rotated, the user can check the fourth level height by placing the height indicating part 452 consisting of four grooves on the upper side, and it is possible to adjust the height to a desired exact height by inserting the polygonal adjusting part 43 into the receiving space 500.

Meanwhile, by using the gap adjusting member 40 whose height is adjusted in the same manner as described above the height of the front surface of the door 20 in the front and rear direction can be adjusted to have the same height in the front surface of adjacent door 31, 32, 33, and 34, furniture, or wall O.

Figure 16:
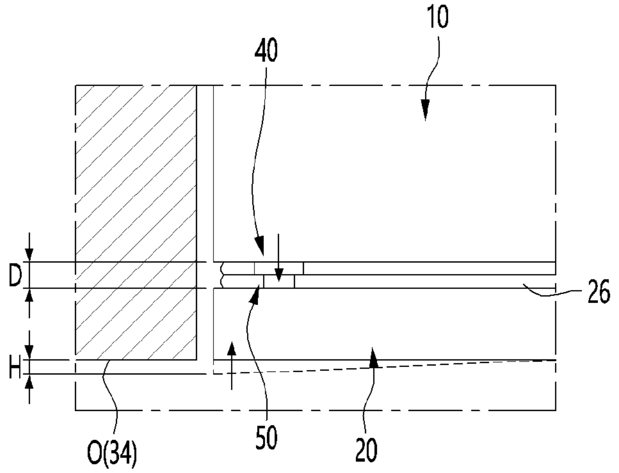
FIG. 16 is a view schematically illustrating a state of adjusting a step between the door and an adjacent configuration.

FIG. 16 is a view schematically illustrating a state of adjusting a step between the door and an adjacent configuration.

As illustrated in the drawing, when the door 20 is closed while the refrigerator 1 is installed, the front surface of the door 34 may protrude by the front surface of the door 34 of the refrigerator 1' adjacent to the door 34 or a difference in height H from the front surface of the door 34 of another refrigerator 1'. Further, in such a state, a step may be generated between the door and the neighboring door 34, the furniture, or wall, thereby deteriorating the outer appearance.

At this time, the user opens the door 20 to adjust the protruding height of the door 20 and then manipulates the gap adjusting member 40 mounted on the rear surface 222 of the door 20 and thus the protruding height of the gap adjusting member 40 can be lowered.

The user pulls the gap adjusting member 40 to pull the adjusting part 43 out of the receiving space. Even in such a state, the gap adjusting member 40 remains a state of being mounted on the door 20, but the elastic part 441 may be elastically deformed. When the user confirms that the height is rotated to a desired height through the height indicating part 415 and then releases the gap adjusting member 40, the adjusting part 43 can be inserted into the inside of the receiving space 50 by the elastic force of the elastic part 441.

Through such adjusting of the protruding height of the gap adjusting member 40, the gap D between the rear surface of the door 20 and the front surface of the cabinet 10 can be adjusted to become narrower. Accordingly, the front surface of the door 20 is lowered by the adjusted height and may be finally located on the same plane as the front surface of the neighboring door 34 or the furniture or wall O.

Meanwhile, the gap adjusting member according to the embodiment of the present disclosure may be various other embodiments in addition to the above-described embodiment. The gap adjusting member according to another embodiment of the present disclosure may have a structure in which a contact part is formed in a circular shape, and a shield portion is further formed in the contact part.

In addition, the gap adjusting member according to another embodiment of the present disclosure differs only in the shape of the contact part and the shield part, but all other configurations are the same, and the same configurations as in the above-described embodiment use the same reference numerals, and detailed descriptions thereof can be omitted or the illustration thereof can be omitted.

Figure 17:
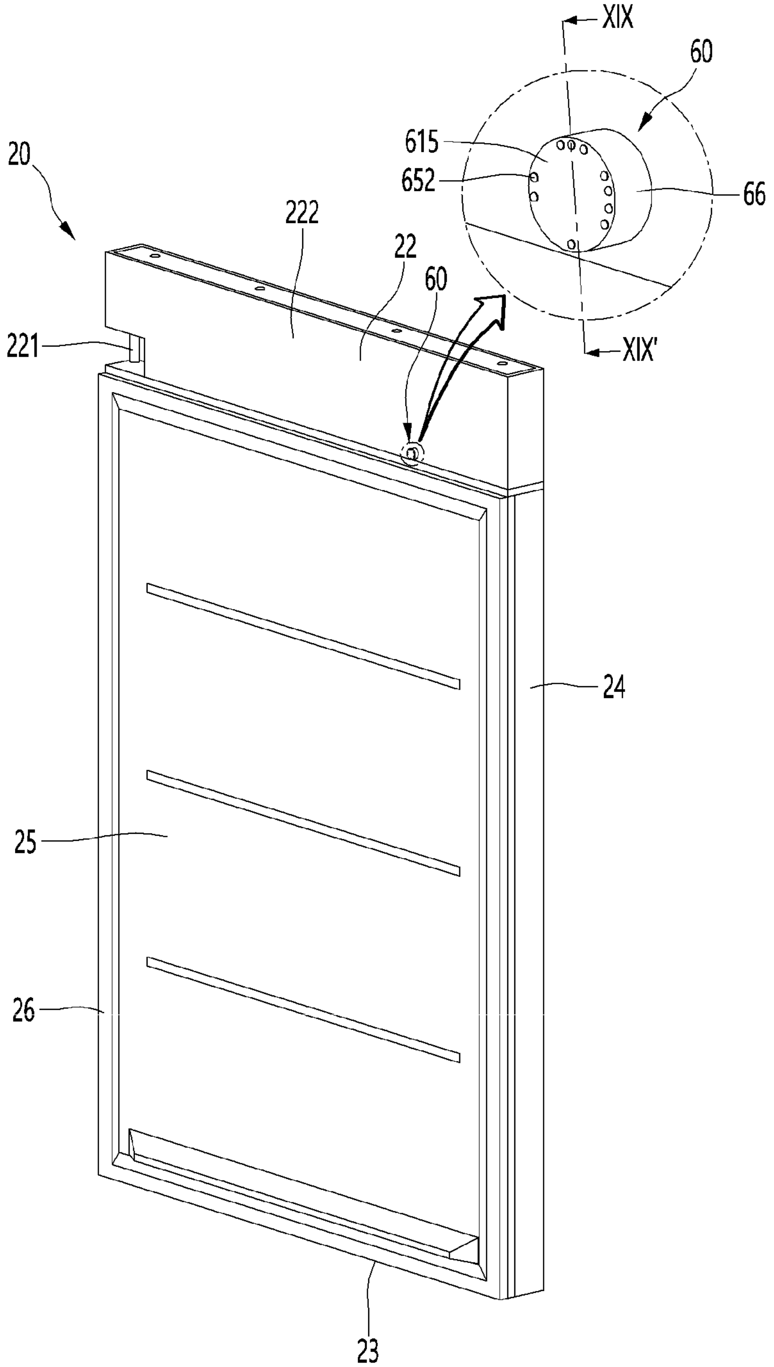
FIG. 17 is a perspective view illustrating a refrigerator door according to another embodiment of the present disclosure viewed from the rear.
Figure 18:
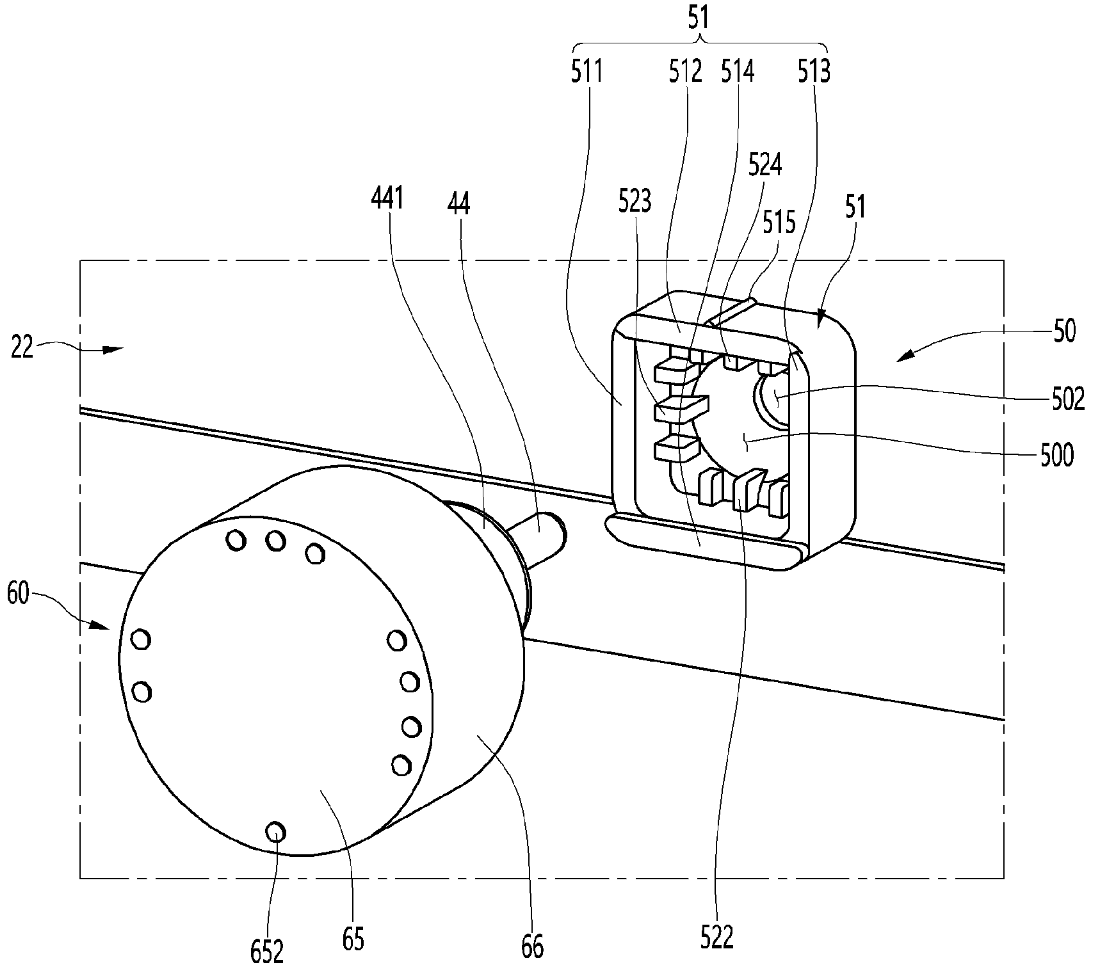
FIG. 18 is an exploded perspective view illustrating a coupling relationship between the gap adjusting member and the seating part.
Figure 19:
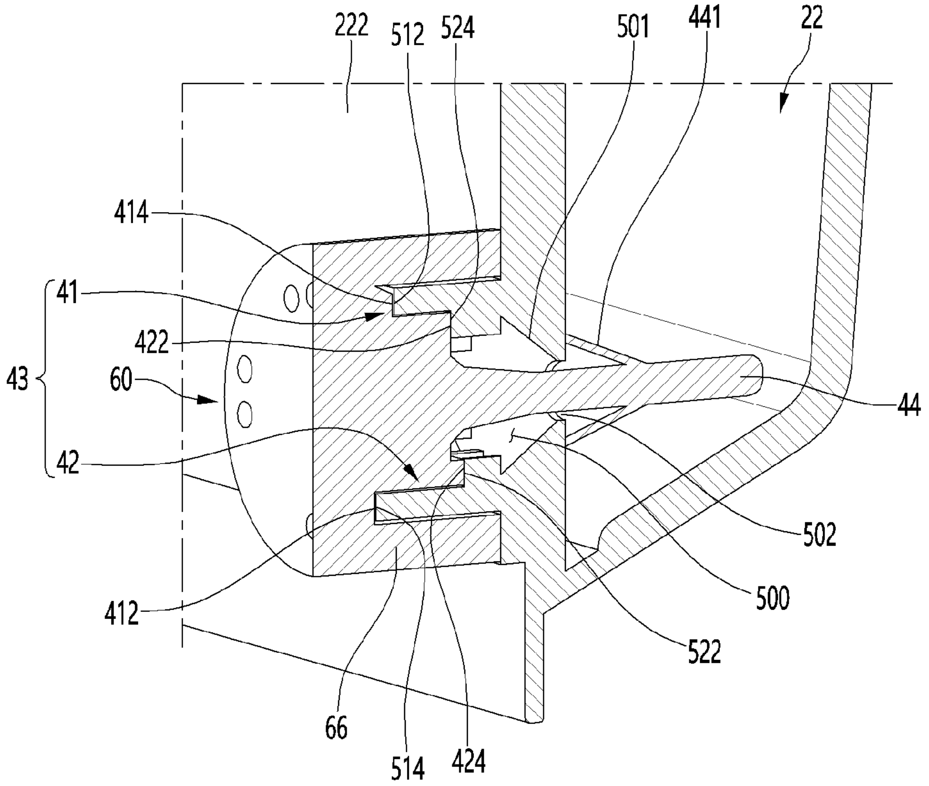
FIG. 19 is a cut-away perspective view taken along line XIX-XIX' of FIG. 17.
Figure 20:
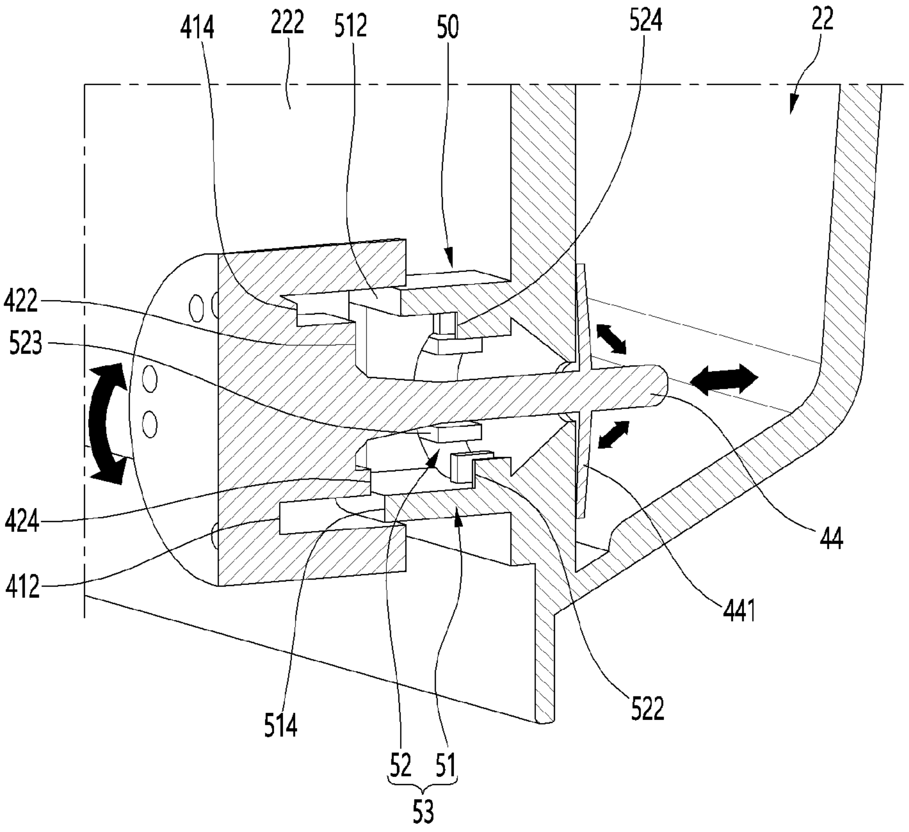
FIG. 20 is a cut-away perspective view of a state where the gap adjusting member is pulled out for height adjustment in FIG. 15.

FIG. 17 is a perspective view illustrating a refrigerator door according to another embodiment of the present disclosure as viewed from the rear. In addition, FIG. 18 is an exploded perspective view illustrating the coupling relationship between the gap adjusting member and the seating part. In addition, FIG. 19 is a cut-away perspective view taken along line XIX-XIX' of FIG. 17. In addition, FIG. 20 is a cut-away perspective view illustrating a state where the gap adjusting member is pulled out for height adjustment in FIG. 15.

As illustrated in the drawings, the outer appearance of the refrigerator door 20 according to another embodiment of the present disclosure, like the door of the above-described embodiment, may be formed by a front plate 21 forming a front surface and a door liner 25 forming a rear surface, and an upper cap deco 22 and a lower cap deco 23 forming the upper and lower surfaces. In addition, the side frames 24 may be further provided on both left and right side surfaces of the door 20.

A part of the rear surface of the door 20 may be formed by the rear surface of the upper cap deco 22. A rear surface of the upper cap deco 22 may be disposed above the gasket 26 mounted on the door liner 25.

A gap adjusting member 60 according to another embodiment of the present disclosure may be provided on the rear surface of the door 20, that is, the rear surface of the upper cap deco 22. The gap adjusting member 60 may protrude from the rear surface of the door 20. In addition, the gap adjusting member 60 may be provided on a side far from the hinge mounting part 221 of the both left and right sides of the upper cap deco 22.

In order to mount the gap adjusting member 60, a seating part 50 may be formed on the rear surface of the upper cap deco 22. The structure and shape of the seating part 50 may be completely the same as in the above-described embodiment.

The seating part 50 may have a polygonal cross-sectional shape and may be formed to have an opened rear surface. In addition, a receiving space 500 may be formed inside the seating part 50, and an inclined surface 501 and a through-hole 502 may be formed in the center, respectively.

In addition, a support part 53 may be formed on the seating part 50. The support part 53 may include a main support part 51 forming an outer circumference shape of the seating part 50 and a sub support part 52 inside the main support part 51.

The main support part 51 includes a first main support part 511, a second main support part 512, a third main support part 513, and a fourth main support part 514, and may be formed in a rectangular shape. In addition, the first main support part 511 has the lowest height, and the height of the second main support part 512, the third main support part 513, and the fourth main support part 514 can be formed to increase stepwise in order.

The sub support part 52 protrudes from an inner surface of the main support part 51 and may be disposed inside the receiving space 500. The sub support part 52 may protrude vertically from each surface of the main support part 51 and may be formed of a plurality of protrusions.

The sub support part 52 may include a first sub support part 521 protruding from an inner surface of the third main support part 513, a second sub support part 522 protruding from an inner surface of the fourth main support part 514, and a third sub support part 523 protruding from the inner surface of the first main support part 511, and a fourth sub support part 524 protruding from the inner surface of the second main support part 51. In addition, the first sub support part 521 has the lowest height, and the height of the second sub support part 522, the third sub support part 523, and the fourth sub support part 524 can increase stepwise.

In addition, a seating part guide 515 may be formed on an outer surface of the second sub support part 522.

Meanwhile, the gap adjusting member 60 may include a contact part 65 forming a rear surface in contact with the cabinet 10, a shielding portion 66 extending forward along the circumference of the contact part 65, and an adjusting part 43 and an insertion protrusion 44 formed on the front surface of the contact part 65. In addition, an elastic part 441 may be formed in the insertion protrusion 44.

The gap adjusting member 60 may be formed of at least a part including the elastic part 441 made of a rubber or silicone material and may be elastically deformed when the gap adjusting member 60 is pulled to provide an elastic force. In addition, at least a part of the gap adjusting member 60 may be formed of an elastic material to mitigate an impact generated upon contact with the cabinet 10.

The contact part 65 forms a rear surface in contact with the cabinet 10 and may be formed in a planar shape. In addition, a height indicating part 652 may be formed on the contact part 65. The height indicating part 652 may protrude in a protrusion shape, and the height may be indicated by the number of protrusions.

In this case, the height indicating part 652 may be arranged to rotate at 90° angle intervals based on the center of the contact part 65. In addition, the height indicating part 652 may be positioned at a position corresponding to the position of the adjusting part 43 to indicate the height of the corresponding adjusting part 43 to the user.

In addition, since the height indicating part 652 protrudes in a protruding shape, the height indicating part 652 may contact the front surface of the cabinet 10 when the door is closed. Accordingly, the contact area between the gap adjusting member 60 and the cabinet 10 is minimized, and deformation and damage of the front surface of the cabinet 10 are prevented.

In addition, a shielding portion 66 extending forward along the periphery of the contact part 65 may be formed. The shielding part 66 may extend from the contact part 65 to the rear surface of the door 20. Therefore, it is possible to shield the seating part 50 from being exposed to the outside in a state where the gap adjusting member 60 is mounted.

The outer surface of the shielding part 66 may be formed in a circular shape, and when the gap adjusting member 60 is manipulated to the lowest height, the extension length of the shielding part 66 can be formed to a length that does not interfere to the rear surface of the door 20.

In addition, the inner surface of the shielding portion 66 may be formed in a shape corresponding to the shape of the seating part 50 having a polygonal shape. Accordingly, in a state where the gap adjusting member 60 is mounted, the inner surface of the shielding part 66 may contact the inner surface of the seating part 50. In other words, the shielding part 66 may be opened rearward, and the seating part 50 is inserted into the shielding part 66 so that the seating part 50 can contact the inside of the shielding part 66.

Meanwhile, an adjusting part 43 and the insertion protrusion 44 may be formed inside the shielding part 66, that is, on the front surface of the contact part 65. The shape and structure of the adjusting part 43 and the insertion protrusion 44 may be the same as those of the above-described embodiment, and reference numerals not illustrated may refer to the above-described embodiments.

The adjusting part 43 may include a main adjusting part 41 protruding from a position corresponding to the main support part 51 and a sub adjusting part 42 protruding from a position corresponding to the sub support part 52.

The main adjusting part 41 is disposed along the circumference of the sub adjusting part 42, in order of height, the first main adjusting part 411, the second main adjusting part 412, and the third main adjusting part 413, and a fourth main adjusting part 414. In addition, the sub adjusting part 42 is located inside the main adjusting part 41 and may include the first sub adjusting part 421 inside the third main adjusting part 413, and the fourth main adjusting part 414 inside a second sub adjusting part 422, a third sub adjusting part 423 inside the first main control part 411, and a fourth sub adjusting part 424 inside the second main control part 412.

The structure of the adjusting part 43 and the structure of the seating part 50 in contact with the adjusting part 43 may be the same as those of the above-described embodiment, and reference numerals not illustrated can refer to the above-described embodiments. Further, the position of the adjusting part 43 in contact with the seating part 50 is changed by the rotation of the adjusting part 43 so that the height of the gap adjusting member 60 can be adjusted.

Meanwhile, the insertion protrusion 44 may extend forward from the center of the sub adjusting part 42 and penetrate the through-hole 502 to be located inside the door 20. In addition, an elastic part 441 may be formed around the insertion protrusion 44. The elastic part 441 may be inserted along the inclined surface 501 to elastically support the rear surface of the door 20 while being positioned in front of the through-hole 502.

The gap adjusting member 60 having such a structure may be able to adjust the height by a simple manipulation without separate separation and disassembly manipulation.

When the door 20 is opened, the gap adjusting member 60 is pulled rearward, as illustrated in FIG. 20, the adjusting part 43 pulls out to the opened rear surface of the seating part 50. In this case, the elastic part 441 may be elastically deformed by being supported by the rear surface of the door 20.

In a state where the adjusting part 43 is moved outside the receiving space, the user can change the position of the adjusting part 43 by rotating the contact part 65. In other words, by changing the disposition of the adjusting part 43 seated on the seating part 50 by the rotation of the contact part 65, the support part 53 having a different height can be supported by the seating part 50.

When the contact part 65 is rotated so that the support part 53 can be disposed at a desired position, the gap adjusting member 60 may be rotated about the insertion protrusion 44. In addition, the selected height can be checked through the height indicating part 652.

When the gap adjusting member 60 is released after rotating the adjusting part 43 to a desired height, the adjusting part 43 may be inserted into the receiving space of the seating part 50 by an elastic force. In addition, the adjusting part 43 is supported by the support part 53 and at the same time can be inserted into the receiving space 500 so that the gap adjusting member 60 can maintain a stable mounting state.

Meanwhile, a refrigerator according to an embodiment of the present disclosure may have various other embodiments in addition to the above-described embodiments. A refrigerator according to another embodiment of the present disclosure is characterized in that a gap adjusting member having a circular shape on a rear surface in contact with the cabinet and a seating part on which the gap adjusting member is seated have the same outer diameter. In addition, the refrigerator according to another embodiment of the present disclosure has only the shape of the contact part and the outer shape of the seating part among the gap adjusting members, all other configurations are the same, the same configurations as those of the above-described embodiment use the same reference numerals, and the detailed description may be omitted or the illustration thereof may be omitted.

Figure 21:
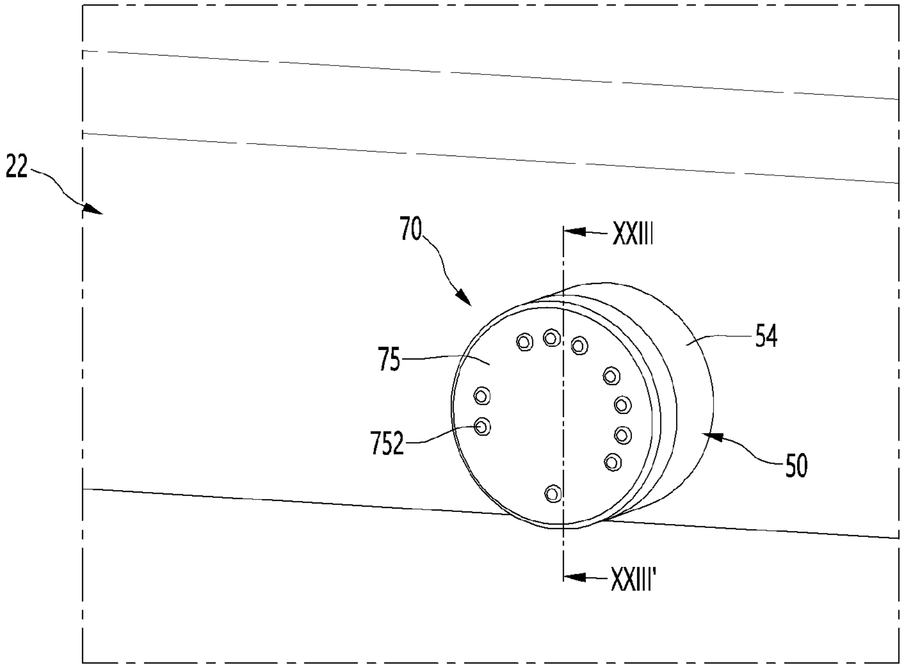
FIG. 21 is a partial perspective view illustrating a state where a gap adjusting member is mounted according to another embodiment of the present disclosure.
Figure 22:
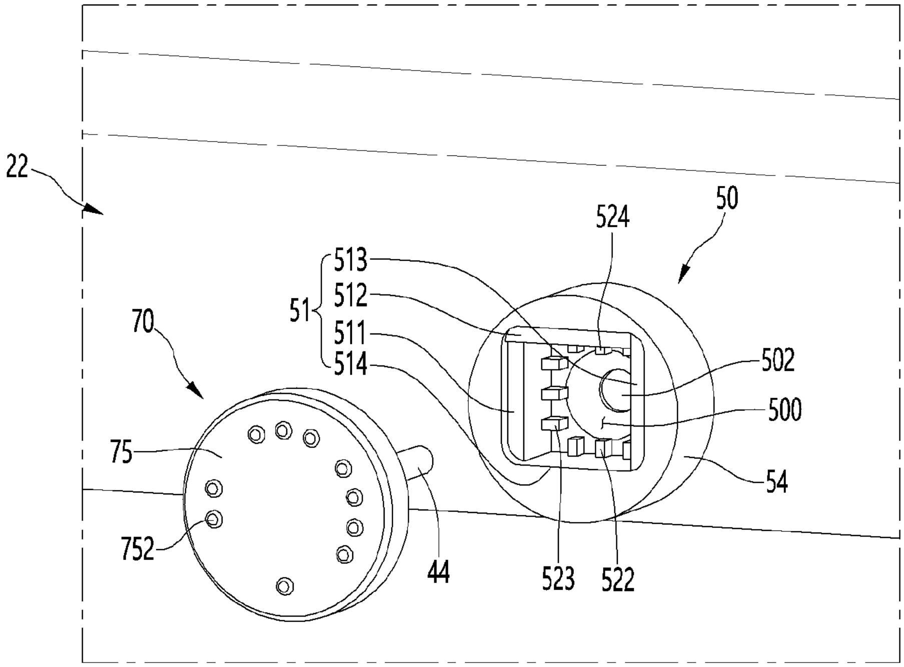
FIG. 22 is an exploded perspective view illustrating a state where the gap adjusting member of the present disclosure is separated from the seating part.
Figure 23:
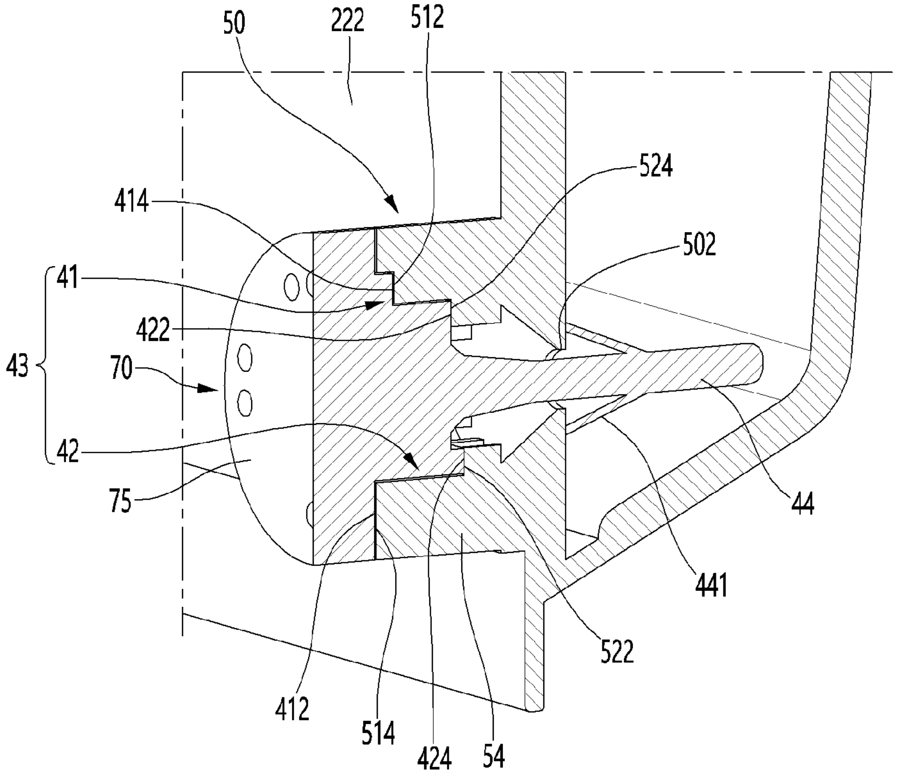
FIG. 23 is a cut-away perspective view taken along line XXIII-XXIII' of FIG. 21.

FIG. 21 is a partial perspective view illustrating a state where a gap adjusting member is mounted according to another embodiment of the present disclosure. In addition, FIG. 22 is an exploded perspective view illustrating the gap adjusting member of the present disclosure separated from the seating part. In addition, FIG. 23 is a cut-away perspective view taken along the line XXIII-XXIII' of FIG. 21.

As illustrated in the drawing, a gap adjusting member 70 contacting the cabinet 10 may be provided on the rear surface of the door 20 of the refrigerator according to another embodiment of the present disclosure when the door 20 is closed.

The gap adjusting member 70 may be mounted on the seating part 50 formed on the rear surface of the upper cap deco 22. In addition, as in the above-described embodiment, the gap adjusting member 70 may be rotated while being pulled out to the rear, and then seated on the seating part 50 again, thereby adjusting the height.

In detail, the gap adjusting member 70 may include a contact part 75 forming a rear surface in contact with the cabinet 10, and an adjusting part 43 and an insertion protrusion 44 formed on the front surface of the contact part 75. In addition, an elastic part 441 may be formed in the insertion protrusion 44.

The gap adjusting member 70 may be formed of at least a part including the elastic part 441 of a rubber or silicone material to be elastically deformed when the gap adjusting member 70 is pulled to provide an elastic force. In addition, at least a part of the gap adjusting member 70 may be formed of an elastic material to mitigate an impact generated when contacting the cabinet 10.

The contact part 75 forms a rear surface in contact with the cabinet 10 and may be formed in a planar shape. The contact part 75 may be formed in a circular shape corresponding to the size of the seating part 50, and may be formed to have a predetermined thickness to mitigate an impact when the door 20 is closed.

In addition, a height indicating part 752 may be formed on the rear surface of the contact part 75. The height indicating part 752 may be recessed, and the height may be displayed by the number of recessed spots. The height indicating part 752 may be arranged to be rotated at 90° angle intervals based on the center of the contact part 75. In addition, the height indicating part 752 may be positioned at a position corresponding to the position of the adjusting part 43 to display the height of the corresponding adjusting part 43 to the user.

Meanwhile, an adjusting part 43 and the insertion protrusion 44 may be formed on the front surface of the contact part 65. The shape and structure of the adjusting part 43 and the insertion protrusion 44 may be the same as those of the above-described embodiment, and reference numerals not illustrated may refer to the above-described embodiments.

The adjusting part 43 may include a main adjusting part 41 protruding from a position corresponding to the main support part 51 of the seating part 50 and a sub adjusting part 42 protruding from the position corresponding to the sub supporting part 52 of the seating part 50.

The main adjusting part 41 is disposed along the circumference of the sub adjusting part 42, and may include, in order of height, the first main adjusting part 411, the second main adjusting part 412, and the third main adjusting part 413, and a fourth main adjusting part 414. In addition, the sub adjusting part 42 is located inside the main adjusting part 41 and may include the first sub adjusting part 421 inside the third main adjusting part 413, and a second sub adjusting part 422 inside the fourth main adjusting part 414, a third sub adjusting part 423 inside the first main control part 411, and a fourth sub adjusting part 424 inside the second main control part 412.

The structure of the adjusting part 43 and the structure of the seating part 50 in contact with the adjusting part 43 may be the same as those of the above-described embodiment, and reference numerals not illustrated can refer to the above-described embodiments. In addition, the position of the adjusting part 43 in contact with the seating part 50 is changed by the rotation of the adjusting part 43 so that the height of the gap adjusting member 70 can be adjusted.

In addition, the insertion protrusion 44 may extend forward from the center of the sub adjusting part 42 and is positioned inside the door 20 through the through-hole 502. In addition, an elastic part 441 may be formed around the insertion protrusion 44. The elastic part 441 may be inserted along the inclined surface 501 to elastically support the rear surface of the door 20 while being positioned in front of the through-hole 502.

Meanwhile, in order to mount the gap adjusting member 70, a seating part 50 may be formed on the rear surface of the upper cap deco 22. The rest of the structure and shape of the seating part 50 except for the outer seating part edge 54 may be completely the same as in the above-described embodiment.

The seating part 50 may include a seating part edge 54 having an outer diameter equal to the outer diameter of the contact part 75. The seating part edge 54 may form an outer circumferential surface of the seating part 50. The seating part edge 54 may be formed to have a circular cross section of a size and shape corresponding to the contact part 75 and can protrude rearward by the predetermined height so that the receiving space 500 and the support part 53 may be formed therein.

The receiving space 500 having a polygonal shape corresponding to the adjusting part 43 may be formed inside the seating part edge 54 so that the adjusting part 43 of the gap adjusting member 70 is inserted. In addition, an inclined surface 501 and a through-hole 502 may be formed in the center of the receiving space 500, respectively.

In addition, a support part 53 may be formed on the seating part 50. The support part 53 may include a main support part 51 formed on a protruding rear surface of the seating part 50 and a sub support part 52 inside the main support part 51.

The main support part 51 includes a first main support part 511, a second main support part 512, a third main support part 513, and a fourth main support part 514 and may be formed in a rectangular shape. In addition, the first main support part 511 has the same lowest height as the rear surface of the seating part edge 54, and in the order of the second main support part 512, the third main support part 513, and the fourth main support part 514, the height may be formed to increase stepwise.

The sub support part 52 protrudes from an inner surface of the main support part 51 and may be disposed inside the receiving space 500. The sub support part 52 may protrude vertically from each surface of the main support part 51 and may be formed of a plurality of protrusions.

The sub support part 52 includes a first sub support part 521 protruding from an inner surface of the third main support part 513, a second sub support part 522 protruding from an inner surface of the fourth main support part 514, a third sub support part 523 protruding from the inner surface of the first main support part 511, and a fourth sub support part 524 protruding from the inner surface of the second main support part 51. In addition, the first sub support part 521 has the lowest height, and the height of the second sub support part 522, the third sub support part 523, and the fourth sub support part 524 can increase stepwise.

In addition, a seating part guide 515 may be formed on an outer surface of the second sub support part 522.

The gap adjusting member 70 having such a structure may be capable of adjusting the height by a simple manipulation without separate separation and disassembly manipulation.

In a state where the door 20 is opened, when the gap adjusting member 70 is pulled rearward, the adjusting part 43 may be pulled out to the opened rear surface of the seating part 50 or further rearward therefrom. In this case, the elastic part 441 may be elastically deformed by being supported by the rear surface of the door 20.

In a state where the adjusting part 43 is moved outside the receiving space, the user may change the position of the adjusting part 43 by rotating the contact part 75. In other words, by changing the disposition of the adjusting part 43 seated on the seating part 50 by the rotation of the contact part 75, the support part 53 having a different height can be supported by the seating part 50.

When the contact part 75 is rotated so that the support part 53 can be disposed in a desired position, the gap adjusting member 70 may be rotated about the insertion protrusion 44 as a shaft. In addition, the selected height can be checked through the height indicating part 752.

When the gap adjusting member 70 is released after rotating the adjusting part 43 to a desired height, the adjusting part 43 may be inserted into the receiving space of the seating part 50 by an elastic force. In addition, the adjusting part 43 is supported by the support part 53 and at the same time can be inserted into the receiving space 500 so that the gap adjusting member 70 maintains a stable mounting state.

In a state where the manipulation for adjusting the height of the gap adjusting member 70 is completed, the gap adjusting member 70 may be fixedly mounted to the seating part 50. In addition, in a state where the gap adjusting member 70 is mounted on the seating part 50, the contact part 75 and the seating part rim 54 have the same outer diameter, so that the gap adjusting member 70 and the circumferential surface of the seating part 50 does not protrude to the outside or recessed. In other words, in a state where the gap adjusting member 70 protrudes from the rear surface of the door 20, the outer appearance thereof can be kept cleaner and more united.

Meanwhile, a refrigerator according to an embodiment of the present disclosure may have various other embodiments in addition to the above-described embodiments. In a refrigerator according to another embodiment of the present disclosure, a pair of doors may be disposed side by side on both left and right sides, and a gap adjusting member may be provided on each of the left and right doors. In addition, the refrigerator according to another embodiment of the present disclosure differs only in the structure and disposition of the door, but all other components are the same, and the same components as in the above-described embodiment use the same reference numerals, and detailed descriptions thereof can be omitted or the illustration thereof can be omitted.

Figure 24:
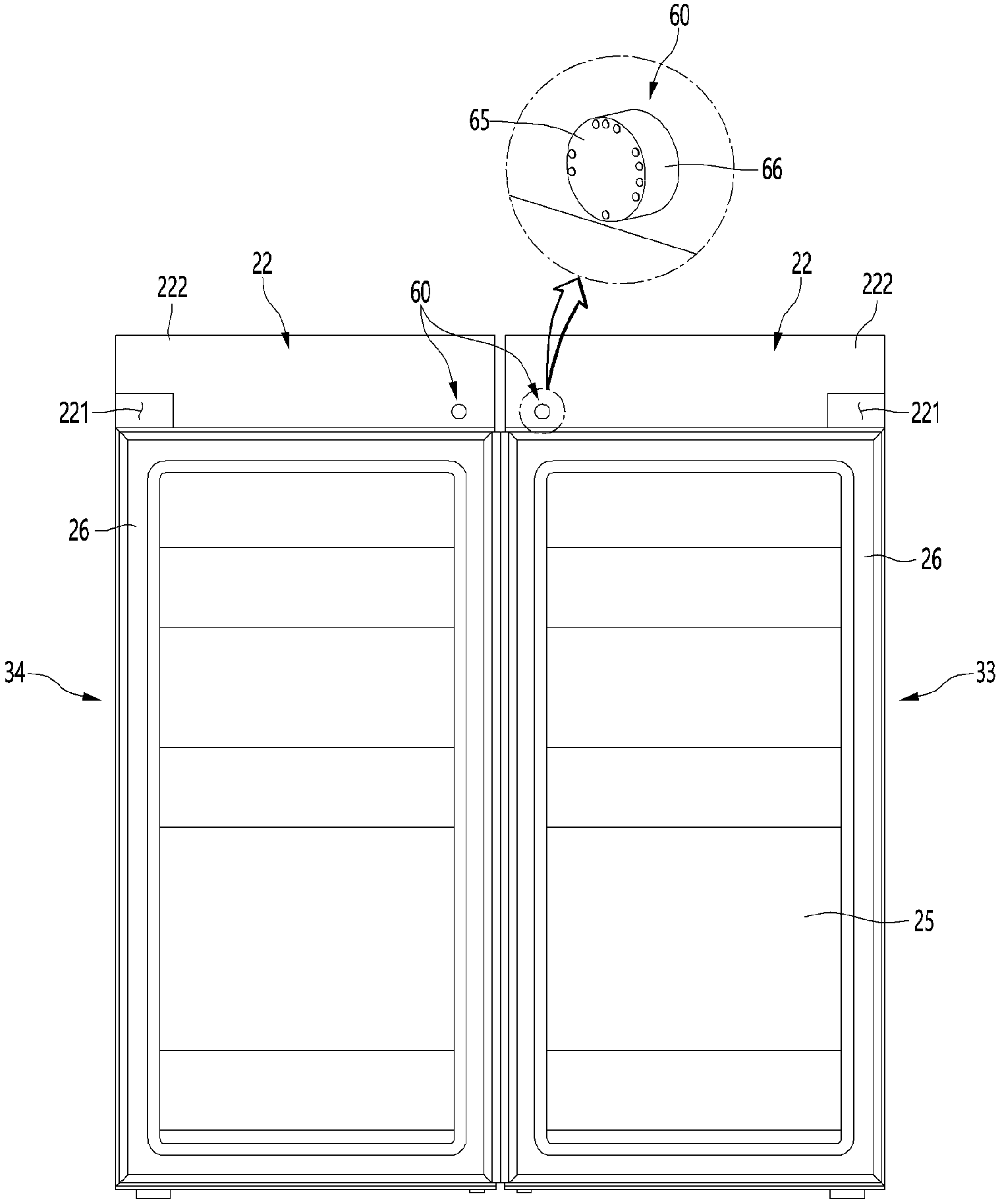
FIG. 24 is a perspective view illustrating a refrigerator door according to another embodiment of the present disclosure viewed from the rear.
Figure 25:
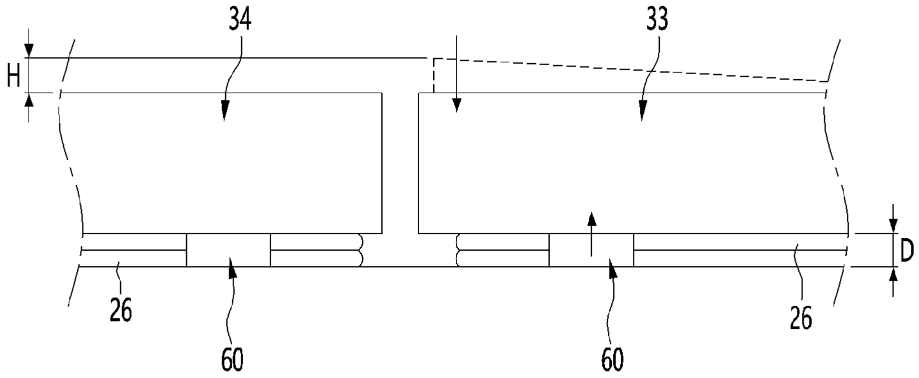
FIG. 25 is a view schematically illustrating a state of adjusting a step between the refrigerator doors.

FIG. 24 is a perspective view illustrating a refrigerator door according to another embodiment of the present disclosure viewed from the rear. In addition, FIG. 25 is a view schematically illustrating a state of adjusting a step between the doors of the refrigerator.

As illustrated in the drawings, a pair of refrigerator doors 33 and 34 according to another embodiment of the present disclosure may be provided on both left and right sides. The pair of doors 33 and 34 may be referred to as a left door 34 and a right door 33.

The left door 34 and the right door 33 are disposed side by side to form a front outer appearance of the refrigerator 1. In this case, the left door 34 and the right door 33 may be configured to open and close one storage space by rotation. In addition, the left door 34 and the right door 33 may be configured to open and close each storage space disposed on the left and right by rotation.

The left door 34 and the right door 33 may have the same basic structure, and although not illustrated in detail, as in the above-described embodiment, the left door 34 and the right door 33 may include a front plate 21 forming the front surface, a door liner 25 forming a rear surface, an upper cap deco 22 forming an upper surface, and a lower cap deco 23 forming a lower surface.

The door liner 25 may be provided with a gasket 26 that contacts the cabinet 10 and seals the storage space. In addition, an upper end corresponding to an area above the gasket 26 among the rear surfaces of the left door 34 and the right door 33 may be formed by the rear surface 222 of the upper cap deco 22.

A gap adjusting member 60 according to another embodiment of the present disclosure may be provided on rear surfaces of the left door 34 and the right door 33, that is, the rear surface 222 of the upper cap deco 22. The gap adjusting member 60 may protrude from the rear surface of the left door 34 and the right door 33. In addition, the gap adjusting member 60 may be provided on a side far from the hinge mounting part 221 of the left and right sides of the upper cap deco 22.

In order to mount the gap adjusting member 60, a seating part 50 may be formed on the rear surface of the upper cap deco 22. The structure and shape of the gap adjusting member 60 and the seating part 50 are completely the same as those of the above-described embodiments, and thus a detailed description thereof will be omitted.

The gap adjusting member 60 may be provided in both the left door 33 and 34 and the right door 33 and 34, and if necessary, the gap adjusting member 60 can be provided only in any one of the left door 33 and 34 and the right door 33, 34.

In addition, the gap adjusting member 60 may be mounted on the door liner 25 outside the gasket 26 when the door liner 25 extends outside the gasket 26. In this case, the seating part 50 may be formed on the door liner 25.

Meanwhile, as illustrated in FIG. 25, in a state where the left door and the right door are closed, the height of the front surface of the door may vary according to a state of mounting the door or a state of a load disposed on the door.

In particular, in a structure in which the pair of doors 33 and 34 are disposed side by side with each other, the space between the left door 34 and the right door 33 may be very narrow. In this state, in a case where the left door 34 and the right door 33 have different heights from each other, a step between the pair of doors 33 and 34 may be very noticeable, and thus there is a problem of deteriorating the outer appearance.

Therefore, as illustrated, in a case where the front surface of the right door 33 (as seen in FIG. 25) protrudes more than the front of the left door 34 and a difference in height H occurs in the front and rear directions, the gap adjusting member 60 of the right door 33 is manipulated.

The user opens the doors 33 and 34 to adjust the protruding height of the doors 33 and 34, and then manipulates the gap adjusting member 60 mounted on the rear surface 222 of the right door 33 so that the protruding height of the gap adjusting member 60 may be lowered.

The user pulls the gap adjusting member 60 to pull the adjusting part 43 out of the receiving space. Even in such a state, the gap adjusting member 60 maintains a state of being mounted on the right door 33, but the elastic part 441 may be elastically deformed. After confirming that the user has rotated to the desired height through the height indicating part 615, when the gap adjusting member 60 is released, the adjusting part 43 can be inserted into the inside of the receiving space 500 by the elastic force of the elastic part 441.

By adjusting the protruding height of the gap adjusting member 60 as described above, the distance D between the rear surface of the right door 33 and the front surface of the cabinet 10 can be adjusted to become narrower. Accordingly, the front surfaces of the doors 33 and 34 are lowered by the adjusted height, and finally, the front surfaces of the doors 33 and 34 can be positioned on the same plane as the front surfaces of the left door 34.

Meanwhile, a refrigerator according to an embodiment of the present disclosure may have various other embodiments in addition to the above-described embodiments. In a refrigerator according to another embodiment of the present disclosure, a gap adjusting member may be provided on a top cover. In addition, in the refrigerator according to another embodiment of the present disclosure, only the position of the gap adjusting member is different, but all other configurations are the same, and the same configurations as in the above-described embodiment use the same reference numerals, and detailed descriptions thereof can be omitted or the illustration thereof can be omitted.

Figure 26:
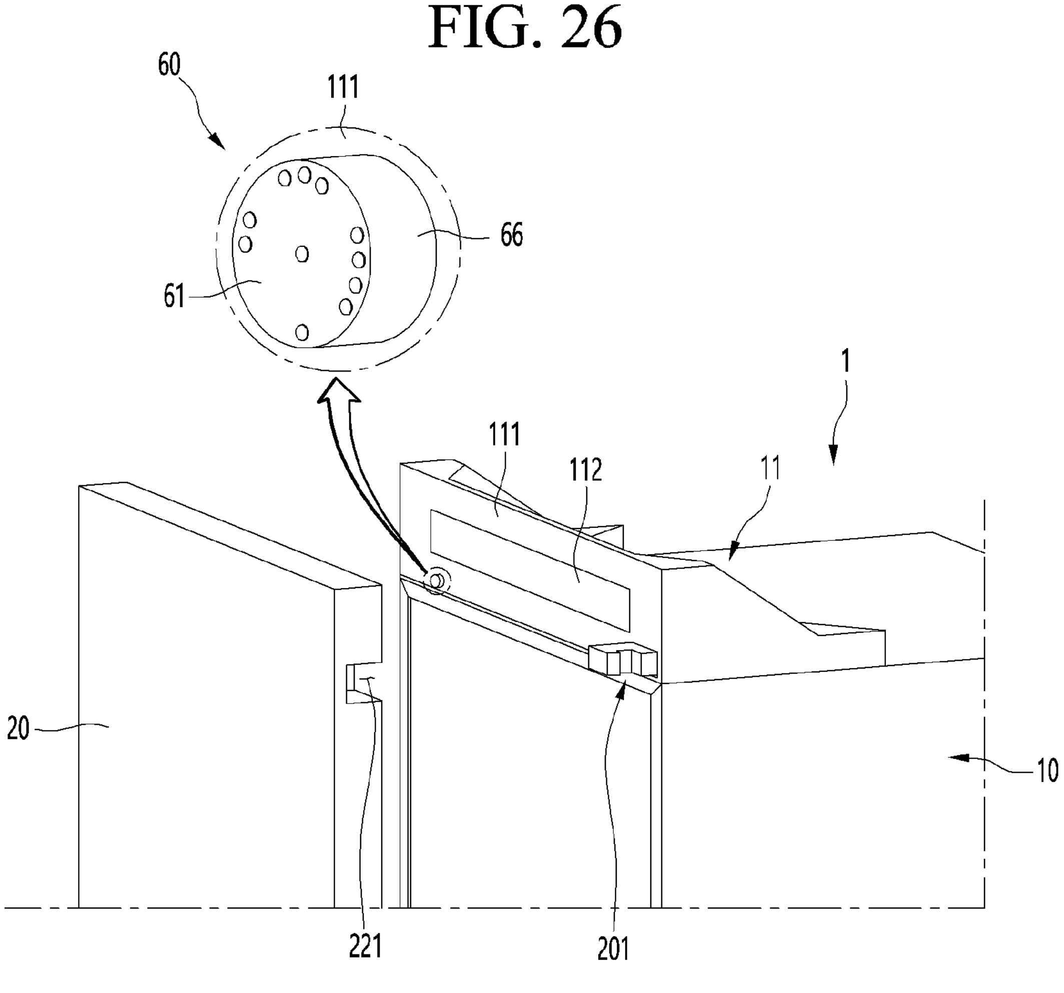
FIG. 26 is an exploded perspective view illustrating a state where a refrigerator door according to another embodiment of the present disclosure is separated.

FIG. 26 is an exploded perspective view illustrating a state where a refrigerator door is separated according to another embodiment of the present disclosure.

As illustrated in the drawings, a refrigerator 1 according to another embodiment of the present disclosure may include a cabinet 10 in which a storage space is formed, and a door 20 for opening and closing the storage space.

An upper hinge 201 may be provided on an upper surface of the cabinet 10, and the upper hinge 201 may be connected to a hinge mounting part 221 at one end of the door 20. Accordingly, the door 20 may open and close the storage space by rotating about the upper hinge 201 as a shaft.

In addition, a top cover 11 may be provided on an upper front surface of the cabinet 10. The top cover 11 may extend from an upper surface of the cabinet 10 to a position corresponding to a height of an upper end of the door 20. Accordingly, the top cover 11 may be positioned at a position facing each other with the rear surface of the door 20.

A front surface of the top cover 11 may be formed in a planar shape, and a display 112 may be disposed to display an operating state of the refrigerator 1. In addition, if necessary, an electric component or a PCB may be further provided inside the top cover 11.

Meanwhile, the gap adjusting member 60 may be provided on one side of the top cover 11. The gap adjusting member 60 may be disposed on one side of the left and right sides of the top cover 11 and the other side far from the side on which the upper hinge 201 is disposed. Further, the gap adjusting member 60 may protrude forward, and thus, when the door 20 is closed, the door 20 contacts the rear surface of the door 20 to support the door 20.

The gap adjusting member 60 may be positioned higher than the upper surface of the cabinet 10, and thus, the gap adjusting member 60 is positioned higher than the gasket 26 on the rear surface of the door 20, so that the door 20 does not interfere with the gasket 26 when the door 20 is opened or closed.

Meanwhile, in order to mount the gap adjusting member 60, the seating part 50 may be formed on the front surface of the top cover 11. Since the shape of the seating part 50 and the shape and coupling structure of the gap adjusting member 60 are exactly the same as those of the above-described embodiment, reference may be made to the above-described embodiment, and a detailed description thereof will be omitted.

The protruding height of the door 20 can be adjusted by pulling and rotating the gap adjusting member 60 as in the above-described embodiment, and when the gap adjusting member 60 is placed at a desired height, the gap adjusting member 60 can have a structure that is mounted on the seating part 50 again.

Accordingly, it is possible to adjust the step of the door 20 by mounting the gap adjusting member 60 on the top cover 11 without changing the structure of the door 20.

Of course, in a case where the height of the cabinet 10 is higher so that the gap adjusting member 60 can be disposed, the gap adjusting member 60 may be installed on the front surface of the cabinet 10.

Meanwhile, a refrigerator according to an embodiment of the present disclosure may have various other embodiments in addition to the above-described embodiments. The refrigerator according to another embodiment of the present disclosure may have a structure in which a separate elastic part is not formed in the gap adjusting member, and the gap adjusting member can be pulled out and returned by the elastic deformation of the gap adjusting member itself. In addition, some structures of the gap adjusting member and the structure of the seating part according to another embodiment of the present disclosure may be the same as those of the above-described embodiment, and reference numerals not illustrated may refer to the above-described embodiments. Accordingly, the same configurations as those of the above-described embodiment use the same reference numerals, and detailed descriptions thereof may be omitted or the illustration thereof may be omitted.

Figure 27:
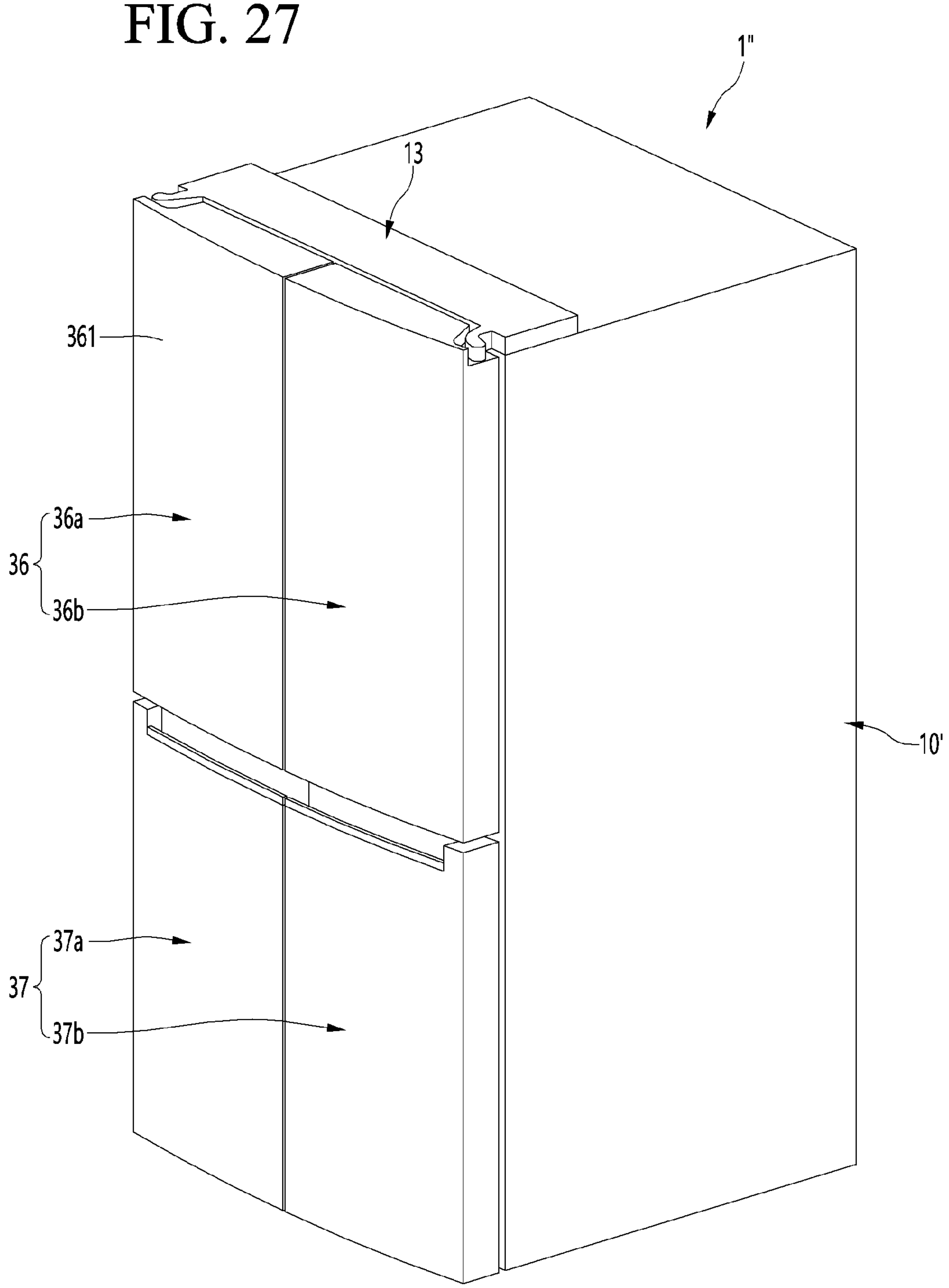
FIG. 27 is a perspective view illustrating a refrigerator according to another embodiment of the present disclosure.
Figure 28:
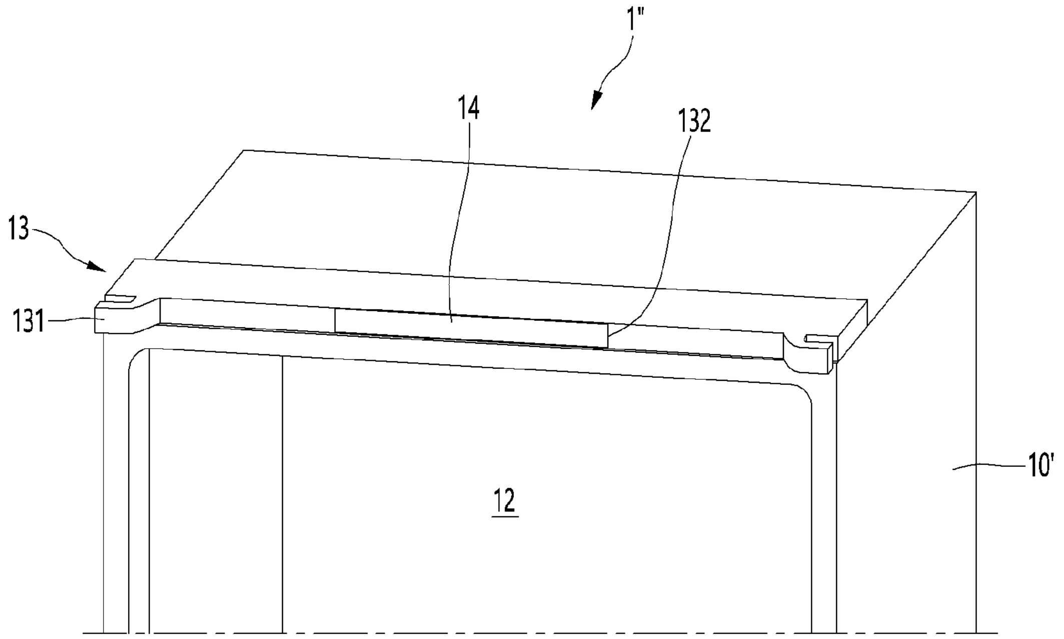
FIG. 28 is a partial perspective view illustrating an upper portion of the cabinet of the refrigerator.

FIG. 27 is a perspective view illustrating a refrigerator according to another embodiment of the present disclosure. In addition, FIG. 28 is a partial perspective view illustrating an upper portion of the cabinet of the refrigerator.

As illustrated in the drawings, a refrigerator 1" according to another embodiment of the present disclosure may be installed alone like a general refrigerator. The refrigerator 1" may be externally formed by a cabinet 10' forming a storage space and doors 36 and 37 that open and close the front surface of the cabinet 10'.

For example, the storage space of the cabinet 10' may be divided up and down and may form an upper storage space 12 and a lower storage space. In addition, the upper storage space 12 may be opened and closed by a pair of upper doors 36. The upper doors 36*a* and 36*b* are disposed side by side on both left and right sides and may be configured to open and close the upper storage space 12 by rotation. In addition, the lower storage space may be opened and closed by a pair of lower doors 37*a* and 37*b*. The lower door 37 is also disposed side by side on both left and right sides and may be configured to open and close the lower storage space by rotation.

As another example, the storage space of the cabinet 10' may be divided left and right. In this case, the doors may be disposed side by side on both left and right sides to open and close the storage space on the left and the storage space on the right.

Meanwhile, a top cover 13 may be provided on an upper surface of the cabinet 10'. The top cover 13 may be located at a front end of the cabinet 10', and hinge cover parts 131 for receiving a hinge device coupled to an upper end of the upper door 36 may be formed at both side ends. Accordingly, the top cover 13 may be referred to as a hinge cover.

The top cover 13 may extend from a left end to a right end of the upper surface of the cabinet 10' and may protrude further upward than the upper surface of the cabinet 10'. In addition, the top cover 13 has an opened lower surface to receive the hinge device therein. In addition, a PCB for controlling the operation of the refrigerator 1" may be provided inside the top cover 13 as needed, and a door switch for sensing opening/closing of the upper door 36 may be provided.

In addition, a display 14 may be disposed in the center of the top cover 13. The display 14 may be mounted inside the top cover 13 and may be exposed to the front through an opening 132 in front surface of the top cover 13.

The height of the top cover 13 may be equal to or slightly lower than the height of the upper end of the upper door 36. Accordingly, in a state where the upper door 36 is closed, the front surface of the top cover 13 is not exposed to the front, and the display 14 is also not exposed.

When the upper door 36 is opened, the display 14 may be exposed forward, and operation information of the refrigerator 1" may be displayed through the display 14. Of course, the display 14 not only displays information, but also includes a manipulation part that a user directly manipulates and may allow a user's manipulation input. For example, the display 14 may be a touch display capable of inputting a touch screen operation.

The display 14 may be disposed in a central area of the front surface of the top cover 13 and may be disposed at least in an area between the gap adjusting members 80 provided in the upper door 36. Therefore, when the upper door 36 is closed, the display may not come into contact with the gap adjusting member 80 protruding from the rear side of the upper door 36. In other words, the gap adjusting member 80 to be described in detail below may contact the front surface of the top cover 13 that is outside the display 14 when the upper door 36 is closed.

Hereinafter, the structure of the gap adjusting member 80 will be described in more detail with reference to the drawings.

Figure 29:
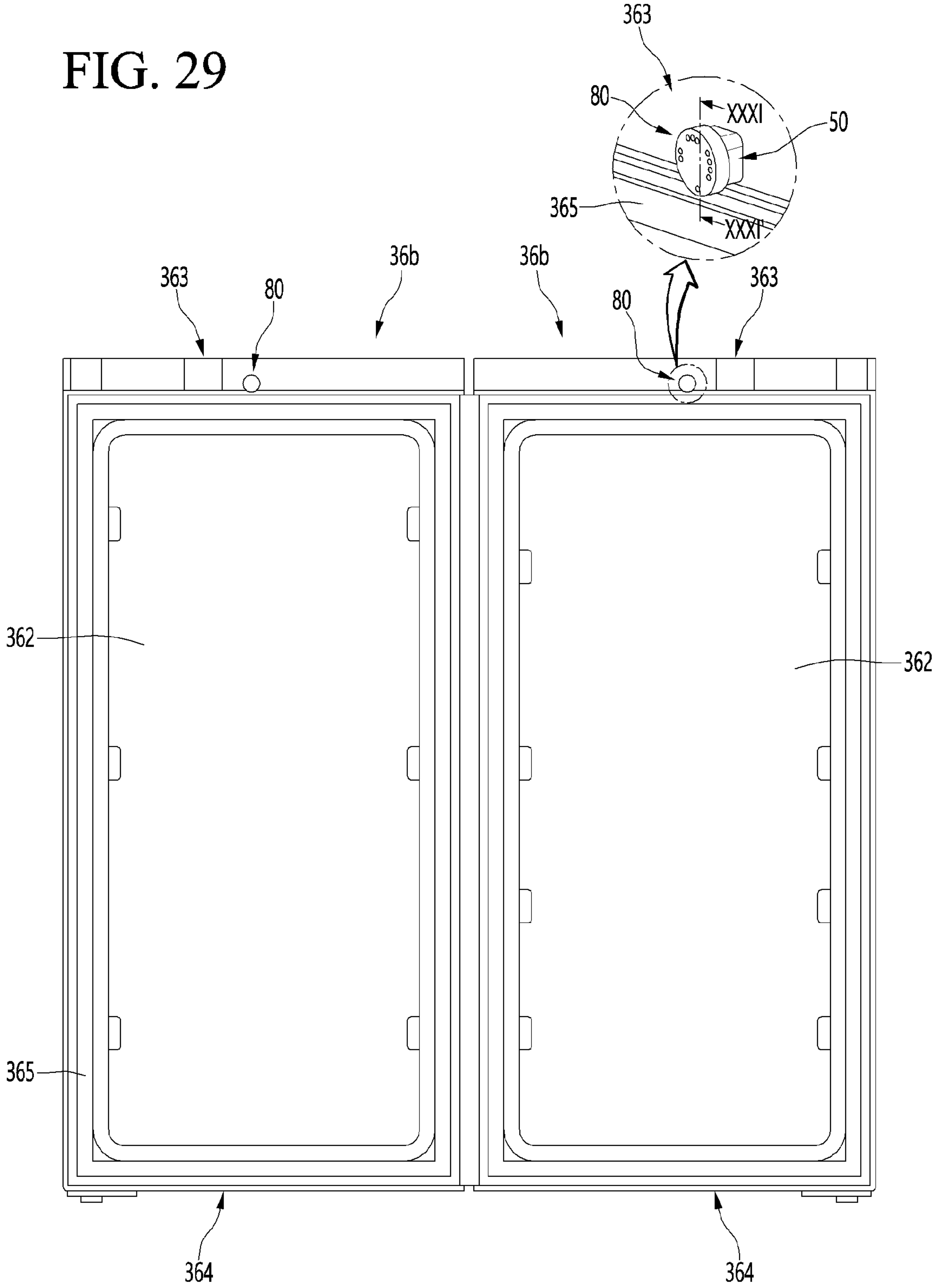
FIG. 29 is a rear view illustrating a refrigerator door according to another embodiment of the present disclosure.
Figure 30:
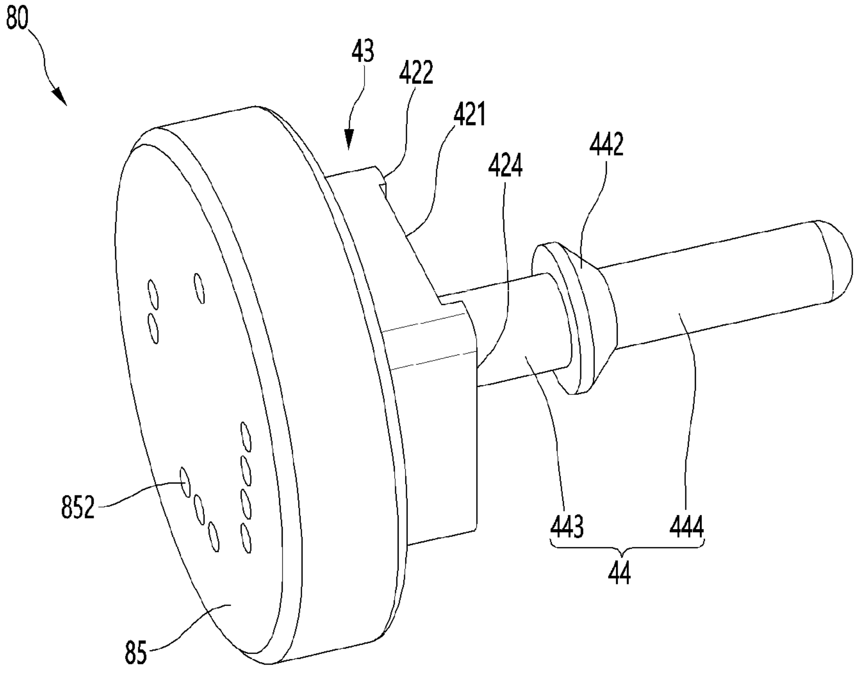
FIG. 30 is a perspective view illustrating a gap adjusting member according to another embodiment of the present disclosure.
Figure 31:
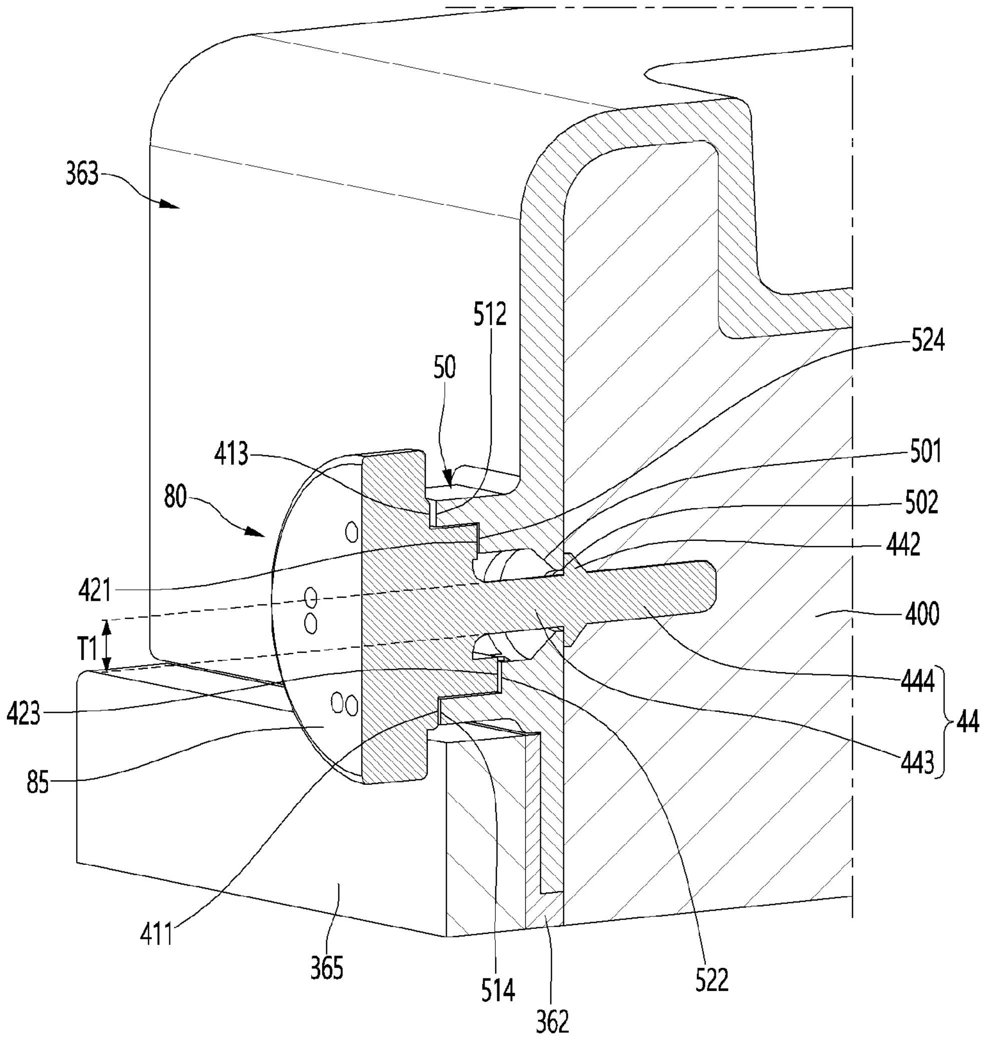
FIG. 31 is a cut-away perspective view taken along line XXXI-XXXI' of FIG. 29.

FIG. 29 is a rear view illustrating a refrigerator door according to another embodiment of the present disclosure. In addition, FIG. 30 is a perspective view illustrating a gap adjusting member according to another embodiment of the present disclosure. In addition, FIG. 31 is a cut-away perspective view taken along line XXXI-XXXI' of FIG. 29.

As illustrated in the drawing, a pair of the upper doors 36 may be disposed on both left and right sides and may be composed of an upper left door **36*a* and an upper right door 36*b*, respectively. The upper left door 36*a* and the upper right door 36*b* may have the same basic structure and size. Of course, if necessary, the upper left door 36*a* and the upper right door 36*b* may have different configurations. For example, a door on one side may have a door in door (DID) structure disposed in two layers and may be configured in the form of a transparent door capable of seeing the inside. However, the size and shape will be the same when viewed from the front, and the basic structure will also be the same. Accordingly, hereinafter, both the upper left door 36*a* and the upper right door 36*b* may be referred to as a door or an upper door 36**.

In detail, the upper door 36 may include an out plate 361 forming an outer surface exposed to the outside of the refrigerator, a door liner 362 forming an inner surface facing the inside of the refrigerator, an upper cap deco 363 that connects the out plate 361 and the upper end of the door liner 362 and forms the upper surface of the upper door 36, and a lower cap deco 364 that connects the outer plate 361 and the lower end of the door liner 362 and connects the lower surface of the upper door 36. In addition, the outer plate 361, the door liner 362, the upper cap deco 363, and the lower cap deco 364 may form a space in which the insulating material 400 can be filled.

In addition, a gasket 365 in contact with the front surface of the cabinet 10' may be further provided along the circumference of the door liner 362. In addition, although not illustrated in detail, the upper door 36 on one side may be provided with an opening and closing member for opening and closing a space between the pair of upper doors 36, and a plurality of door baskets may be provided on the rear surface of the door liner 362.

Meanwhile, the upper cap deco 363 may form a part of the rear surface of the upper door 36. In addition, a gap adjusting member 80 may be provided on the rear surface of the upper cap deco 363. The gap adjusting member 80 protrudes from the rear surface of the upper door 36 and can adjust the height protruding from the rear surface of the upper door 36 by a user's manipulation. Of course, the gap adjusting member 80 may be provided in the lower cap deco 364 as necessary, and may be configured to be in contact with one side of the cabinet 10'.

Therefore, in a state where the upper door 36 is closed, the distance between the rear surface of the upper door 36 and the cabinet 10' can be adjusted, and as a result, the height of protrusion of the front surface of the upper door 36 in the front and rear direction can be adjusted. In addition, by adjusting the protruding height of the front surface of the upper door 36 in the front and rear direction, it is possible to eliminate a height difference in the front and rear direction between the pair of upper doors 36.

The gap adjusting member 80 may be located at one side away from both left and right side ends of the upper door 36. The gap adjusting member 80 may be positioned further outside the display 14 in a closed state. Accordingly, the gap adjusting member 80 may be disposed at a position further spaced apart than half the length of the left and right sides of the display 14 from one end of the upper door 36 far from the rotation axis of the upper door 36 among the left and right ends of the upper door 36.

In addition, the gap adjusting member 80 is positioned as close to the display 14 as possible within a range that does not interfere with the display 14 in a state where the upper door 36 is closed, so that the height of the upper door 36 in the front and rear direction can be easily adjusted.

The gap adjusting member 80 may protrude from the rear surface of the upper cap deco 363. In addition, in order to mount the gap adjusting member 80, a seating part 50 may be formed on the rear surface of the upper cap deco 363. The structure and shape of the seating part 50 may be completely the same as in the above-described embodiment.

The seating part 50 may have a polygonal cross-sectional shape and may be formed to have an opened rear surface. In addition, a receiving space 500 may be formed inside the seating part 50, and an inclined surface 501 and a through-hole 502 may be formed in the center.

In addition, a support part 53 may be formed on the seating part 50. The support part 53 may include a main support part 51 forming an outer circumference shape of the seating part 50 and a sub support part 52 inside the main support part 51.

The main support part 51 includes a first main support part 511, a second main support part 512, a third main support part 513, and a fourth main support part 514 and may be formed in a rectangular shape. In addition, the first main support part 511 has the lowest height, and the height of the second main support part 512, the third main support part 513, and the fourth main support part 514 can be formed to increase stepwise in order of the second main support part 512, the third main support part 513, and the fourth main support part 514.

The sub support part 52 protrudes from an inner surface of the main support part 51 and may be disposed inside the receiving space 500. The sub support part 52 may protrude vertically from each surface of the main support part 51 and may be formed of a plurality of protrusions.

The sub support part 52 may include a first sub support part 521 protruding from an inner surface of the third main support part 513, a second sub support part 522 protruding from an inner surface of the fourth main support part 514, a third sub support part 523 protruding from the inner surface of the first main support part 511, and a fourth sub support part 524 protruding from the inner surface of the second main support part 51. In addition, the first sub support part 521 has the lowest height, and the height of the second sub support part 522, the third sub support part 523, and the fourth sub support part 524 can be formed to increase stepwise in order of the second sub support part 522, the third sub support part 523, and the fourth sub support part 524.

Meanwhile, the gap adjusting member 80 may include a contact part 85 forming a rear surface in contact with the cabinet 10, an adjusting part 43, and an insertion protrusion 44 formed on the front surface of the contact part 85.

The gap adjusting member 80 is formed of a rubber or silicone material and is elastically deformed when the gap adjusting member 80 is pulled to provide an elastic force. In addition, the gap adjusting member 80 may be formed of an elastic material to mitigate an impact generated when contacting the cabinet 10.

An adjusting part 43 and the insertion protrusion 44 may be formed on the front surface of the contact part 85. The shape and structure of the adjusting part 43 and the insertion protrusion 44 may be the same as those of the above-described embodiment, and reference numerals not illustrated may refer to the above-described embodiments.

The adjusting part 43 may include a main adjusting part 41 protruding from a position corresponding to the main support part 51 and a sub adjusting part 42 protruding from a position corresponding to the sub support part 52.

The main adjusting part 41 is disposed along the circumference of the sub adjusting part 42, in order of height, the first main adjusting part 411, the second main adjusting part 412, the third main adjusting part 413, and a fourth main adjusting part 414. In addition, the sub adjusting part 42 is located inside the main adjusting part 41 and may include the first sub adjusting part 421 inside the third main adjusting part 413, and a second sub adjusting part 422 inside the fourth main adjusting part 414, a third sub adjusting part 423 inside the first main control part 411, and a fourth sub adjusting part 424 inside the second main control part 412.

The structure of the adjusting part 43 and the structure of the seating part 50 in contact with the adjusting part 43 may be the same as those of the above-described embodiment, and reference numerals not illustrated refer to the above-described embodiments. Further, the position of the adjusting part 43 in contact with the seating part 50 is changed by the rotation of the adjusting part 43, so that the height of the gap adjusting member 80 can be adjusted.

The contact part 85 forms a rear surface in contact with the cabinet 10 and may be formed in a planar shape. In addition, a height indicating part 852 may be formed on the contact part 85. The height indicating part 852 may be formed in the shape of a recessed groove, and the height thereof may be displayed by the number of recessed grooves.

In this case, the height indicating part 852 may be arranged to rotate at 90° angle intervals based on the center of the contact part 85. In addition, the height indicating part 852 may be positioned at a position corresponding to the position of the adjusting part 43 to display the height of the corresponding adjusting part 43 to the user.

Meanwhile, the insertion protrusion 44 may extend forward from the center of the sub adjusting part 42 and may be inserted into the door 20 through the through-hole 502.

The insertion protrusion 44 may have a circular cross section so as to be a rotation shaft of the gap adjusting member 80 and may be formed to have a predetermined diameter. In addition, a locking part 442 may be formed in the insertion protrusion 44.

The locking part 442 is locked by the through-hole 502 in a state where the gap adjusting member 80 is mounted, and even when the step adjustment member 80 is pulled, the step adjustment member 80 can be prevented from being separated from the seating part 50.

In detail, the locking part 442 (restrain part) may protrude from an outer surface of the insertion protrusion 44 corresponding to the position of the through-hole 502 in a state where the gap adjusting member 80 is mounted. The locking part 442 may protrude along an outer circumference of the insertion protrusion 44, and the locking part 442 may be formed to have an inclination that decreases in protrusion height toward the rear.

When the gap adjusting member 80 is first mounted on the upper cap deco 363, the inclined circumferential surface of the locking portion 442 is moved forward in contact with the inclined surface 501 and passes through the through-hole 502 while being elastically deformed. After passing through the through-hole 502, the front end of the locking part 442 is restrained while supporting the circumferential surface of the through-hole 502 and thus it is prevented that the locking part 442 passes through the through-hole 502 and falls out to the rear. The gap adjusting member 80 may be mounted in a state where the locking portion 442 passes through the through-hole 502 and is locked, and the gap adjusting member 80 can be manipulated to adjust the height of the gap adjusting member 80.

Meanwhile, the insertion protrusion 44 may include a first protrusion 443 and a second protrusion 444. In detail, the insertion protrusion 44 may include a first protrusion part 443 forming a space between the locking part 442 and the adjusting part 43 based on the locking part 442 and a second protrusion part 444 that forms up to the extended end portion of the insertion protrusion 44 from the locking part 442. The first protrusion part 443 and the second protrusion part 444 may be formed to have the same thickness T1, that is, the same outer diameter, in a state where no external force is applied.

The first protrusion part 443 is positioned in an inner region of the seating part 50 in a state where the gap adjusting member 80 is mounted and is positioned in an outer region of the upper cap deco 363. In addition, when pulled rearward for height adjustment of the gap adjusting member 80, the first protrusion part 443 may be extended while being elastically deformed, and the first protrusion part 443 may have a thickness T2 which becomes relatively thinner than the thickness T1.

In addition, the first protrusion part 443 may be twisted by a rotation manipulation of the gap adjusting member 80 in an extended state. Further, when the gap adjusting member 80 is pulled and released, it may be seated on the seating part 50 again by the restoring force of the first protrusion part 443.

The second protrusion part 444 may be located in an area in front of the seating part 50 in a state where the gap adjusting member 80 is mounted and may be located in an inner area of the upper cap deco 363. The second protrusion part 444 may be buried in the space of the insulating material 400 in a case where the insulating material 400 is filled inside the upper cap deco 363.

In addition, the second protrusion part 444 may maintain its initial thickness and state even when manipulating the height adjustment of the gap adjusting member 80. In other words, even if the gap adjusting member 80 is pulled backward, the position of the second protrusion part 444 is not changed by the locking part 442, and thus the second protrusion part can maintain the state at the time of the first insertion and installation.

The gap adjusting member 80 having such a structure may be able to adjust the height by simple manipulation without separate separation and disassembly manipulation.

Figure 32:
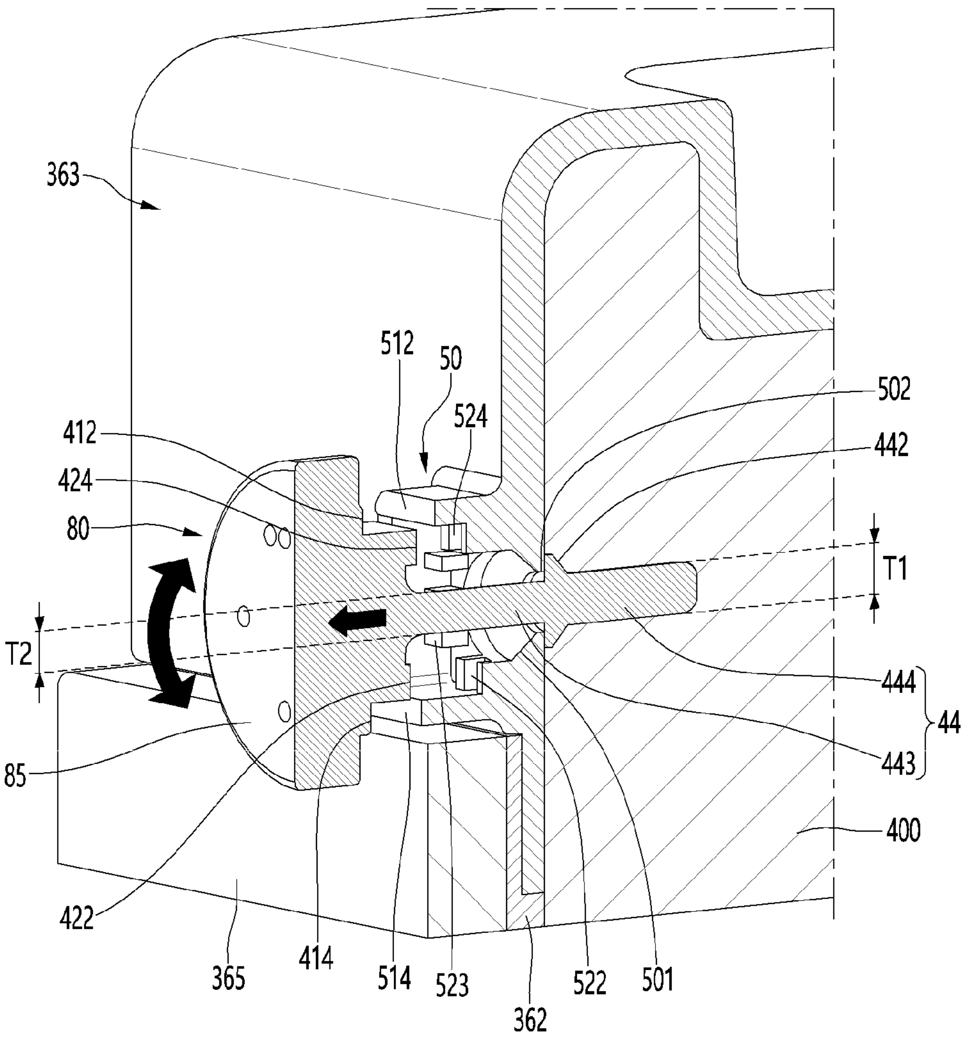
FIG. 32 is a cut-away perspective view illustrating a manipulation state of the step adjustment member.
Figure 33:
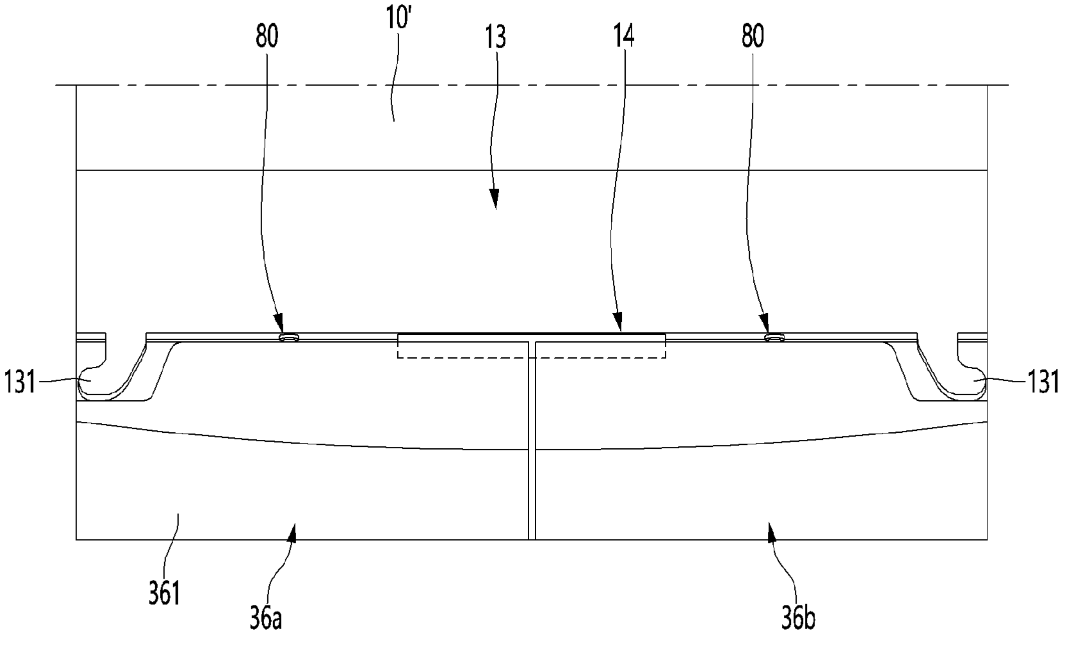
FIG. 33 is a partial perspective view illustrating a state where the door of the refrigerator is closed.

FIG. 32 is a cut-away perspective view illustrating a manipulation state of the gap adjusting member. In addition, FIG. 33 is a partial perspective view illustrating a state where the door of the refrigerator is closed.

As illustrated in the drawing, in order to adjust the front protrusion height of the front of the upper door 36 by manipulating the gap adjusting member 80, first, hold the contact part 85 and pull the gap adjusting member 80 forward.

By such a manipulation, the first protrusion part 443 of the insertion protrusion 44 may extend while being elastically deformed, and as illustrated in FIG. 32, the adjusting part 43 can be pulled out to the opened rear surface of the seating part 50. At this time, the first protrusion part 443 has an elastic restoring force by tension. Further, the second protrusion 444 is maintained in a state of being inserted from the inside of the upper cap deco 363 by the locking part 442.

In a state where the adjusting part 43 is moved to the outside of the receiving space 500, the user may change the position of the adjusting part 43 by rotating the contact part 85. In other words, it is possible to change the disposition of the adjusting part 43 seated on the seating part 50 by rotating the contact part 85, and the support part 53 having a different height can be supported by the seating part 50.

When the contact part 85 is rotated so that the support part 53 can be disposed in a desired position, the gap adjusting member 80 may be rotated about the insertion protrusion 44 as a shaft. In addition, the selected height can be checked through the height indicating part 852.

When the gap adjusting member 80 is released after rotating the adjusting part 43 to a desired height, the adjusting part 43 as illustrated in FIG. 31 due to the elastic restoring force of the first protrusion part 443 may be inserted into the receiving space 500 of the seating part 50. In addition, the adjusting part 43 is supported by the support part 53 and at the same time can be inserted into the receiving space 500 so that the gap adjusting member 80 can maintain a stable mounting state.

As illustrated in FIG. 33, in a state where the upper door is closed, the gap adjusting member provided in the upper left door and the upper right door may contact the cabinet or the top cover, respectively, and may contact the cabinet and the top cover at the same time.

In addition, the position of the gap adjusting member 80 may be located in the left and right sides more than the display 14, so even if the upper door 36 is strongly closed or repeatedly opened and closed, a direct impact is transmitted to the display 14 so that it is not damaged or a mark is not left on the display 14.

It is possible to manipulate the protruding height of the gap adjusting member 80 through the manipulation of the gap adjusting member 80, so that the front surface of the pair of upper doors 36 can be adjusted to have the same height in the front and rear directions. In other words, by a user, the pair of upper doors 36 may be adjusted so that a step does not occur with each other.

Of course, the same structure may also be applied to the lower door 37, and it will be possible to adjust the step between the pair of lower doors 37 and to adjust the step between the upper door 36 and the lower door 37 disposed vertically.

In the refrigerator according to the proposed embodiment, the following effects can be expected.

In the refrigerator according to the embodiment of the present disclosure, the protruding height of the gap adjusting member can be adjusted by manipulating the gap adjusting member while the gap adjusting member is mounted. Therefore, it is possible to immediately and easily adjust the front and rear protruding height of the door, without the need for additional operations, such as separation and mounting.

Therefore, There is an advantage that the height of the front surface of the door in the front and rear direction may be the same as the height of the door of the neighboring refrigerator in the front and rear direction or the height of other adjacent doors in the same refrigerator in the front and rear direction, and, due to the built-in mounting, it can be adjusted to have the same height as neighboring furniture or walls in the front and rear direction and thus the installation outer appearance thereof is improved. In particular, in a case where a plurality of home appliances or refrigerators are built-in, these advantages can be maximized.

In addition, there is an advantage that, when the gap adjusting member is rotated to a desired position after pulling the step adjusting part for height adjusting, the height adjusting member is moved to the mounted state by the elastic force of the elastic part, so that the height adjusting operation is very simple.

In addition, since there is no need to disassemble or separate a separate configuration, there is no need for management of the disassembled configuration during the height adjusting operation, and there is no fear of loss or damage of the configuration, so there is an advantage that maintenance is easy and durability is guaranteed.

In addition, since the elastic part has a structure integrally formed with the gap adjusting member made of an elastic material, the gap adjusting member can be completed in a single configuration, and the structure thereof is very simple. Therefore, there is an advantage that productivity thereof can increase and manufacturing cost thereof can be reduced.

In addition, the gap adjusting member may be formed of a material in which an insertion protrusion serving as a rotation shaft of the gap adjusting member is elastically deformable. Therefore, when the gap adjusting member is pulled for height adjusting, rotated to a desired position, and then gets higher, the contact part and the adjusting part are pulled out of the seating part in a state where the mounting of the gap adjusting member is maintained by the elastic deformation of the insertion protrusion itself. In such a situation, when the contact part is released after the rotation manipulation of the gap adjusting member, the adjusting part is returned to a state where the adjusting part is seated in the seating part by the elastic restoring force of the insertion part, so that the height adjusting operation is very simple.

In addition, since the height indicating part indicating the height to be manipulated is formed on the contact part, the user can check the height to be adjusted through the height indicating part, and thus, there is an advantage of enabling a more accurate and easy height adjusting operation.

In addition, an adjusting member guide is formed in the gap adjusting member, and a seating part guide is formed in the seating part, so that it is easy to align and mount the gap adjusting member and the seating part, and thus misassembly of the gap adjusting member is prevented, and mounting at an accurate position is ensured, thereby ensuring manipulation reliability.

In addition, the adjusting part of the gap adjusting member is formed in a polygonal shape corresponding to the inner shape of the seating part, and when the gap adjusting member is mounted, the adjusting part may be inserted into the seating part. In this case, the adjusting part has a different height along each side of the adjusting part, and thus, when the gap adjusting member is inserted, accurate height adjustment is ensured and misassembly is prevented, thereby ensuring reliability of manipulation.

In addition, in a case where the display is disposed above the cabinet with which the gap adjusting member is in contact, the position of the gap adjusting member may be disposed at a position not in contact with the display, and according to this, even if the door is strongly closed or a repetitive opening and closing operation is performed, it is possible to prevent damage to the display, and there is an advantage in that it is possible to prevent the outer appearance thereof from being deteriorated due to traces caused by the contact with the gap adjusting member.

What is claimed is:

1. A refrigerator comprising:
- a cabinet that defines a storage space therein;
- a door configured to open and close at least a portion of the storage space;
- a seating part that protrudes from a rear surface of the door; and
- a gap adjusting member that is movably inserted into the seating part,
- wherein the gap adjusting member comprises:
  - a contact part in contact with a front of the cabinet,
  - an insertion protrusion that extends from the contact part and passes through a through-hole defined at the seating part,
  - a restrain part that protrudes from the insertion protrusion and that is configured to be restrained in the through-hole based on movement of the gap adjustment member, and
  - a plurality of adjusting parts that protrude from the contact part and are arranged in a rotational direction around the insertion protrusion, the plurality of adjusting parts having different heights from one another,
- wherein a gap between the door and the cabinet is configured to be adjusted by a rearward movement and rotation of the contact part to thereby select one of the different heights of the plurality of adjusting parts in contact with the seating part, and
- wherein a plurality of support parts is disposed on the seating part, protrudes toward the cabinet at different protrusion heights, and is configured to support the gap adjusting member.

2. The refrigerator of claim 1, wherein the gap adjusting member is at least partially made of a deformable material.

3. The refrigerator of claim 2, wherein the insertion protrusion is made of a deformable material, and
- wherein, based on the contact part moving rearward, the insertion protrusion extends elastically while being fixed to the through-hole.

4. The refrigerator of claim 2, wherein the restrain part protrudes along an outer circumference of the insertion protrusion, and
- wherein the restrain part has an inclination such that a protrusion height of the restrain part decreases toward a rear of the contact part.

5. The refrigerator of claim 4, wherein the restrain part is made of a deformable material, configured to provide elastic force so that the gap adjusting member is returned to an inserted state in the seating part after manipulation.

6. The refrigerator of claim 5, wherein the restrain part is formed to be further away from an outer surface of the insertion protrusion as it extends rearward.

7. The refrigerator of claim 5, wherein the contact part is moved rearward, and the restrain part supported by a circumferential surface of the through-hole is elastically deformed.

8. The refrigerator of claim 4, wherein a diameter of the restrain part is greater than a diameter of the through-hole.

9. The refrigerator of claim 2, wherein an inclined surface is formed around the through-hole such that an inner diameter becomes narrower from a front to a rear of the through-hole, and
- wherein the through-hole is formed at a front end of the inclined surface.

10. The refrigerator of claim 9, wherein the restrain part is formed to have an inclination corresponding to the inclined surface.

11. The refrigerator of claim 1, wherein the gap adjusting member is configured to select contact surfaces between the plurality of adjusting parts so that a height of the gap adjusting member is adjusted by a combination of the contact surfaces of the plurality of adjusting parts and the plurality of support parts.

12. The refrigerator of claim 1, wherein the plurality of adjusting parts comprise:
- a main adjusting part that is disposed along each side of the contact part; and
- a sub adjusting part that is disposed inside the main adjusting part and further protrudes toward the seating part relative to the main adjusting part, the sub adjusting part being disposed along each side of the main adjusting part, and
- wherein the main adjusting part and the sub adjusting part define a plurality of protrusion height differences along sides of the contact part, respectively, each side of the contact part having one of the plurality of protrusion height differences.

13. The refrigerator of claim 12, wherein the main adjusting part and the sub adjusting part are located opposite to each other with respect to a center of the contact part, and
- wherein the gap adjusting member is configured to rotate by 180° about the center of the contact part to thereby switch positions of the main adjusting part and the sub adjusting part.

14. The refrigerator of claim 12, wherein a cross-sectional area of the sub adjusting part is equal to a portion of an inside area of a receiving space of the seating part, and the sub adjusting part is configured to be inserted into the receiving space.

15. The refrigerator of claim 12, wherein the plurality of support parts comprises:

a main support part that defines a circumferential surface of the seating part and supports the main adjusting part, and a sub support part that is disposed inside the main support part and supports the sub adjusting part, and wherein the main support part and the sub support part define a plurality of support steps corresponding to the plurality of protrusion height differences, respectively.

16. The refrigerator of claim 1, wherein the gap adjusting member is configured to rotate about the insertion protrusion.

17. The refrigerator of claim 1, wherein the plurality of adjusting parts are arranged in a protrusion height order.

18. The refrigerator of claim 1, further comprising an upper cap deco that is disposed at an upper end of the door and defines an upper surface and the rear surface of the door, wherein the seating part is disposed at the upper cap deco.

19. The refrigerator of claim 1, further comprising a top cover that is disposed at an upper surface of the cabinet and protrudes upward relative to the upper surface of the cabinet, the top cover facing the door, wherein the contact part is configured to be in contact with the top cover based on the door being closed.

* * * * *